United States Patent
Lee et al.

(10) Patent No.: US 11,927,987 B2
(45) Date of Patent: Mar. 12, 2024

(54) DISPLAY DEVICE AND METHOD FOR MANUFACTURING THE SAME

(71) Applicant: Samsung Display Co., Ltd., Yongin-Si (KR)

(72) Inventors: Sun Hee Lee, Hwaseong-si (KR); Sunho Kim, Seongnam-si (KR); Hyun Kim, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 632 days.

(21) Appl. No.: 16/903,844

(22) Filed: Jun. 17, 2020

(65) Prior Publication Data

US 2021/0013447 A1    Jan. 14, 2021

(30) Foreign Application Priority Data

Jul. 12, 2019   (KR) .......................... 10-2019-0084498

(51) Int. Cl.
*G06F 1/16*    (2006.01)
*B32B 3/02*    (2006.01)
(Continued)

(52) U.S. Cl.
CPC .............. *G06F 1/1637* (2013.01); *B32B 3/02* (2013.01); *B32B 7/12* (2013.01); *B32B 27/08* (2013.01);
(Continued)

(58) Field of Classification Search
CPC ....... G06F 1/1637; G06F 1/1626; B32B 3/02; B32B 7/12; B32B 27/08; B32B 37/10;
(Continued)

(56) References Cited

U.S. PATENT DOCUMENTS 9,299,755 B2    3/2016    Namkung et al.
9,430,180 B2    8/2016    Hirakata et al.
(Continued)

FOREIGN PATENT DOCUMENTS

KR   1020130007312 A    1/2013
KR   1020140052714 A    5/2014
(Continued)

OTHER PUBLICATIONS

WO2018043851A1 Machine Translation of Description (Year: 2023).*

*Primary Examiner* — Cynthia L Schaller
(74) *Attorney, Agent, or Firm* — CANTOR COLBURN LLP

(57) ABSTRACT

A display device includes a window, a display module, a protection film, a circuit board, a first area adhesive member, and a second area adhesive member. The window includes a first area providing a front surface and a second area bent from the first area to provide a side surface. The display module includes a first portion coupled to the window and a second portion extending from the first portion. The protection film includes a first film portion corresponding to the first portion and a second film portion corresponding to the second portion, and is disposed below the display module. The first area adhesive member couples the first portion and the first film portion. The second area adhesive member couples the second portion and the second film portion, and has an elastic modulus greater than that of the first area adhesive member. The circuit board is coupled to the second portion.

17 Claims, 21 Drawing Sheets

(51) Int. Cl.
   *B32B 7/12*      (2006.01)
   *B32B 27/08*     (2006.01)
   *B32B 37/10*     (2006.01)
   *B32B 37/12*     (2006.01)
   *H04M 1/02*      (2006.01)
   *B32B 38/00*     (2006.01)
   *H04M 1/18*      (2006.01)

(52) U.S. Cl.
   CPC .............. *B32B 37/10* (2013.01); *B32B 37/12* (2013.01); *G06F 1/1643* (2013.01); *H04M 1/0266* (2013.01); *B32B 2038/0076* (2013.01); *B32B 2307/546* (2013.01); *B32B 2457/20* (2013.01); *G06F 1/1626* (2013.01); *H04M 1/185* (2013.01)

(58) Field of Classification Search
   CPC .............. B32B 37/12; B32B 2307/546; B32B 2457/20; H04M 1/185; G09F 9/301; H10K 59/124; H10K 71/00; G02F 1/133308; G02F 1/133331; G02F 1/13338; G02F 1/133502; G02F 2202/28
   See application file for complete search history.

(56) References Cited

U.S. PATENT DOCUMENTS

| | | | |
|---|---|---|---|
| 9,690,329 B2 | 6/2017 | Jung et al. | |
| 9,987,826 B2 | 6/2018 | Cho et al. | |
| 10,224,502 B2 | 3/2019 | Cho et al. | |
| 10,347,700 B2 | 7/2019 | Yang et al. | |
| 10,578,897 B2 | 3/2020 | Jin et al. | |
| 10,923,669 B2 | 2/2021 | Kim et al. | |
| 11,092,728 B2 | 8/2021 | Jeong et al. | |
| 2011/0187960 A1* | 8/2011 | Kobayashi | G02F 1/1333 445/25 |
| 2013/0002572 A1* | 1/2013 | Jin | G02F 1/133305 345/173 |
| 2014/0118902 A1* | 5/2014 | Kim | G02F 1/133308 361/679.01 |
| 2015/0091012 A1* | 4/2015 | Namkung | H10K 59/1213 257/72 |
| 2016/0295715 A1* | 10/2016 | Cho | B32B 3/263 |
| 2017/0373121 A1* | 12/2017 | Leng | G09G 3/20 |
| 2019/0014669 A1 | 1/2019 | Ahn et al. | |
| 2019/0057645 A1 | 2/2019 | Kwon et al. | |

FOREIGN PATENT DOCUMENTS

| | | |
|---|---|---|
| KR | 1020150001142 A | 1/2015 |
| KR | 1020150038819 A | 4/2015 |
| KR | 1020160001795 A | 1/2016 |
| KR | 1020160050815 A | 5/2016 |
| KR | 1020160119382 A | 10/2016 |
| KR | 1020170040433 A | 4/2017 |
| KR | 1020170091287 A | 8/2017 |
| KR | 1020170113822 A | 10/2017 |
| KR | 1020170133200 A | 12/2017 |
| KR | 1020180025002 A | 3/2018 |
| KR | 101871967 B1 | 6/2018 |
| KR | 1020190029847 A | 3/2019 |
| WO | WO2018043851 A1 * | 3/2018 |

* cited by examiner

DISPLAY DEVICE AND METHOD FOR MANUFACTURING THE SAME

This application claims priority to Korean Patent Application No. 10-2019-0084498, filed on Jul. 12, 2019, and all the benefits accruing therefrom under 35 U.S.C. § 119, the content of which in its entirety is herein incorporated by reference.

BACKGROUND

1. Field

Exemplary embodiments of the invention relate to a display device and a method for manufacturing the same, and more particularly, to a display device having a curved area and a method for manufacturing the same.

2. Description of Related Art

Various display devices used in multimedia devices such as televisions, mobile phones, tablet computers, navigation units, and game consoles have been developed. Each of the display devices includes a keyboard, a mouse, or a remote control as an input unit. The display devices also include a touch panel as the input unit.

In recent years, a bending-type display device, a curved-type display device, a foldable display device, and a rollable display device are being developed.

SUMMARY

Exemplary embodiments of the invention provide a display device providing an image through a front surface and a side surface thereof.

Exemplary embodiments of the invention also provide a method for manufacturing a display device with defects reduced.

An exemplary embodiment of the invention provides a display device including a window including a first area which provides a front surface and a second area which is bent from the first area and provides a side surface, a display module including a first portion coupled to the window and a second portion extending from the first portion, a protection film including a first film portion corresponding to the first portion and a second film portion corresponding to the second portion, the protection film being disposed below the display module, a first area adhesive member which couples the first portion and the first film portion, a second area adhesive member which couples the second portion and the second film portion and having an elastic modulus greater than an elastic modulus of the first area adhesive member, and a circuit board coupled to the second portion.

In an exemplary embodiment, the first area adhesive member may have the elastic modulus of about 0.01 megapascal (MPa) to about 10 MPa, and the second area adhesive member may have an elastic modulus of about 1 MPa to about 200 MPa.

In an exemplary embodiment, the first area adhesive member may have a thickness greater than a thickness of the second area adhesive member.

In an exemplary embodiment, the first area adhesive member may have a thickness of about 1 micrometer (μm) to 100 μm, and the second area adhesive member may have a thickness of about 1 μm to 200 μm.

In an exemplary embodiment, the first film portion may have a thickness less than a thickness of the second film portion.

In an exemplary embodiment, the first film portion may have an area greater than an area of the second film portion.

In an exemplary embodiment, the first film portion may be spaced apart from the second film portion.

In an exemplary embodiment, the second area may further provide a curved surface, and the second area may include a curved area which provides the curved surface and a side area which provides the side surface.

In an exemplary embodiment, the curved area may have a curvature radius of about 2 millimeters (mm) to about 5 mm.

In an exemplary embodiment, an angle between the first area and the side area may be about 80 degrees (°) to about 90°.

In an exemplary embodiment, the side surface may have a width of about 4 mm to about 8 mm.

In an exemplary embodiment, the front surface may be defined by a first directional axis and a second directional axis, the second area may include two bending areas facing each other in the first directional axis and overlapping the display module and the two bending areas facing each other in the second directional axis and overlapping the display module.

In an exemplary embodiment, the second portion may protrude to the outside of one of the bending areas.

In an exemplary embodiment, the display module may further include a display panel, an input sensor disposed on the display panel, and an anti-reflection unit disposed on the display panel.

In an exemplary embodiment, the second portion may be bent such that the second portion faces the first portion.

In an exemplary embodiment, the first area adhesive member may be coupled to an entirety of the first portion, and the second area adhesive member may be coupled to an entirety of the second portion.

In an exemplary embodiment, the second area adhesive member may be coupled to a portion of the first portion.

In an exemplary embodiment of the invention, a method for manufacturing a display device includes providing a window including a first area which provides a front surface and a second area bent from the first area to provide a side surface, arranging a working panel on a pressing pad, wherein the working panel includes a display module, a first adhesive member disposed on a top surface of the display module, a protection film disposed below the display module, a second adhesive member which couples the display module and the protection film, a carrier film disposed below the protection film, and a carrier adhesive member which couples the carrier film and the protection film, coupling the working panel to the window by the pressing pad so that the first adhesive member is coupled to the first area and the second area, and detaching the carrier adhesive member, the carrier film, and the pressing pad from the protection film. Here, the display module includes a first portion coupled to the window by the first adhesive member and a second portion extending from the first portion, the protection film includes a first film portion corresponding to the first portion and a second film portion corresponding to the second portion, and the second adhesive member includes a first area adhesive member which couples the first portion and the first film portion and a second area adhesive member which couples the second portion and the second film portion and having an elastic modulus greater than an elastic modulus of the first area adhesive member.

In an exemplary embodiment, the method may further include photo-curing the carrier adhesive member between the coupling the working panel to the window and the detaching the carrier adhesive member, the carrier film, and the pressing pad from the protection film.

In an exemplary embodiment, the method may further include bonding a circuit board to the second portion of the display module after the detaching from the protection film.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1:
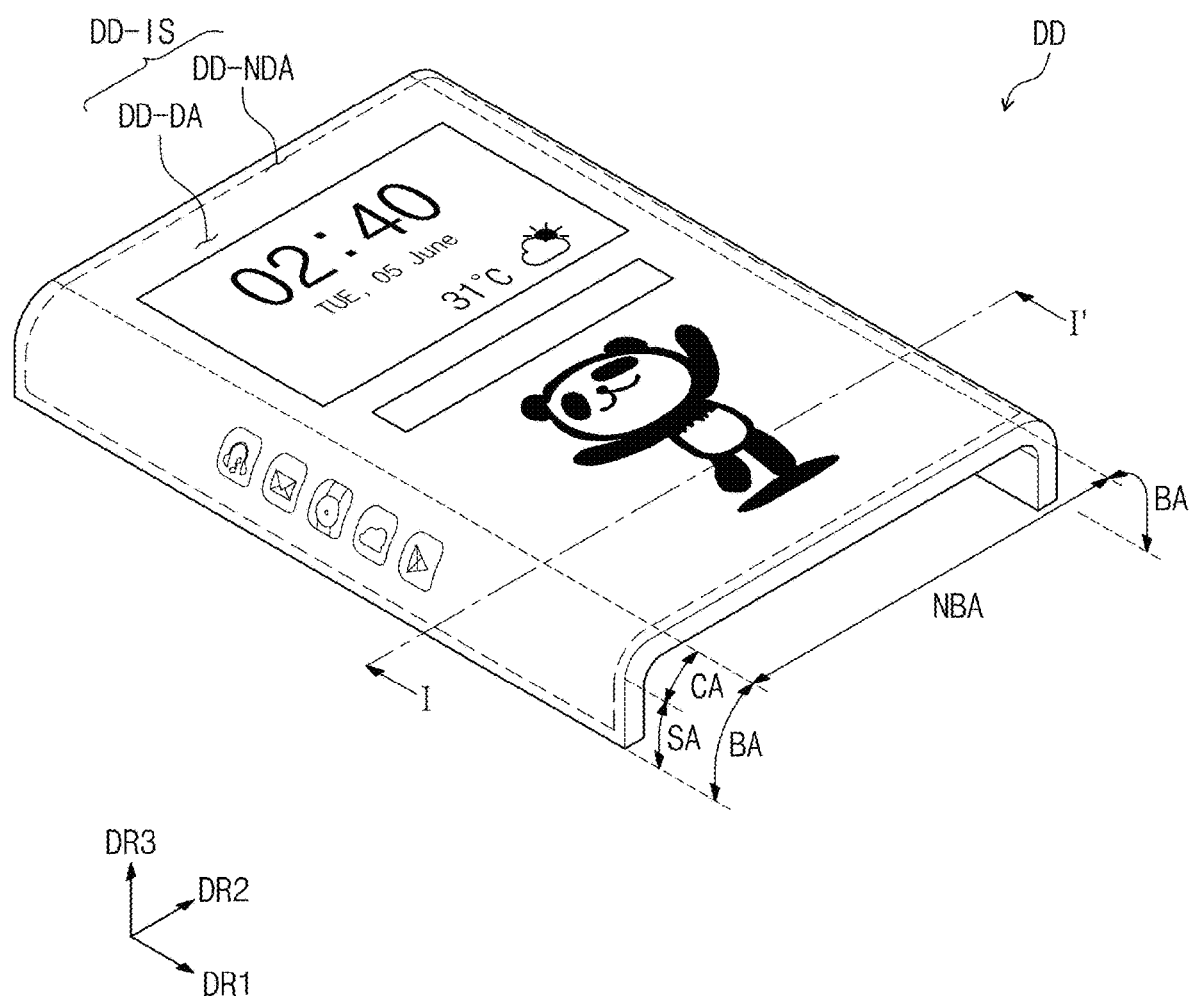
FIG. 1 is a perspective view illustrating an exemplary embodiment of a display device according to the invention.

In this specification, it will also be understood that when one component (or region, layer, portion) is referred to as being 'on', 'connected to', or 'coupled to' another component, it can be directly disposed/connected/coupled on/to the one component, or an intervening third component may also be present.

Like reference numerals refer to like elements throughout. Also, in the drawing figures, the thickness, ratio, and dimensions of components are exaggerated for clarity of illustration. The term "and/or" includes any and all combinations of one or more of the associated listed items.

It will be understood that although the terms such as 'first' and 'second' are used herein to describe various elements, these elements should not be limited by these terms. The terms are only used to distinguish one component from other components. For example, a first element referred to as a first element in one exemplary embodiment can be referred to as a second element in another exemplary embodiment without departing from the scope of the appended claims. The terms of a singular form may include plural forms unless referred to the contrary.

Also, ""under", "below", "above', "upper", and the like are used for explaining relation association of components illustrated in the drawings. The terms may be a relative concept and described based on directions expressed in the drawings.

The meaning of 'include' or 'comprise' specifies a property, a fixed number, a step, an operation, an element, a component or a combination thereof, but does not exclude other properties, fixed numbers, steps, operations, elements, components or combinations thereof.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as generally understood by those skilled in the art. Terms as defined in a commonly used dictionary should be construed as having the same meaning as in an associated technical context, and unless defined apparently in the description, the terms are not ideally or excessively construed as having formal meaning.

Hereinafter, exemplary embodiments of the invention will be described with reference to the accompanying drawings.

Figure 2:
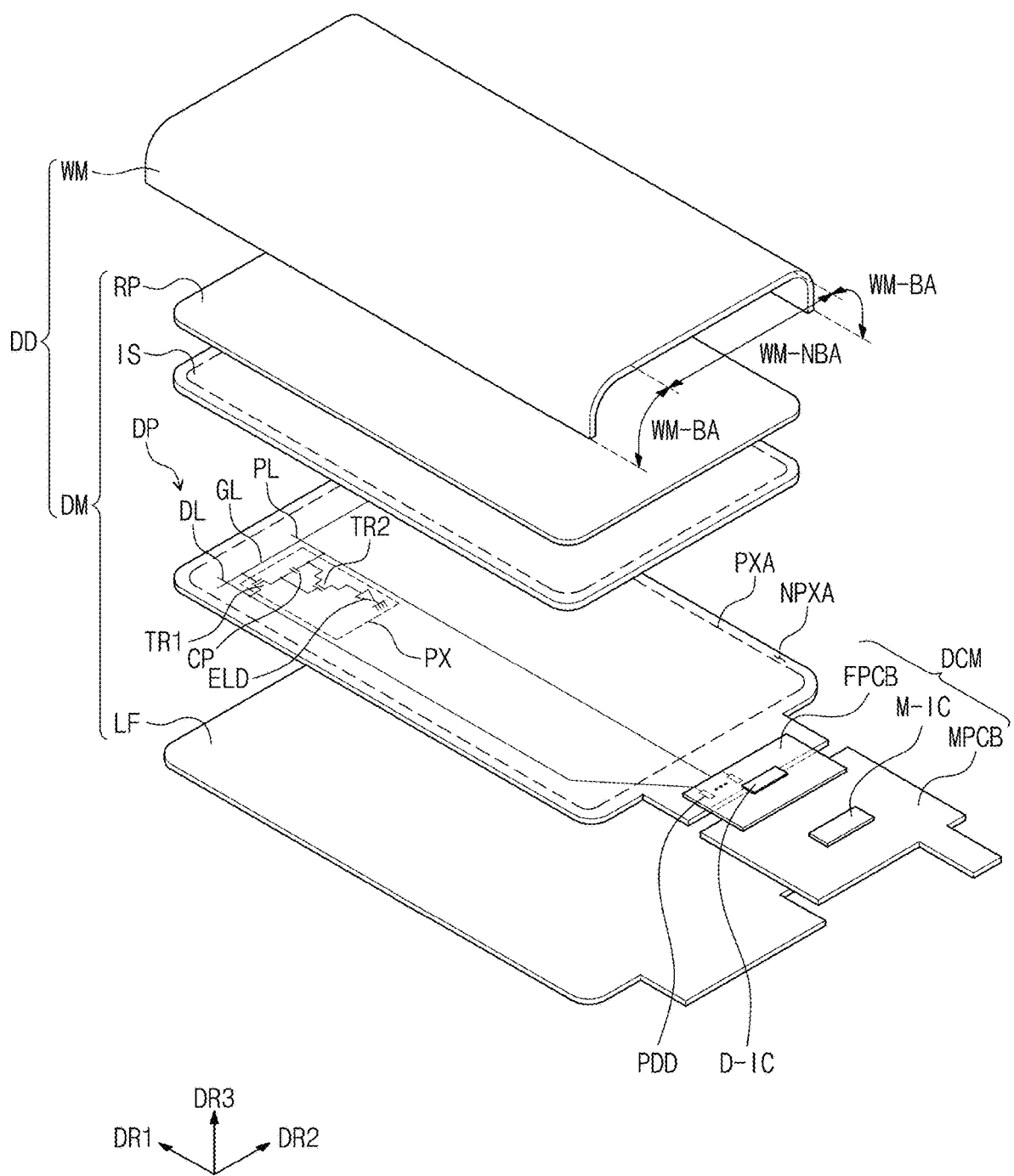
FIG. 2 is an exploded perspective view illustrating an exemplary embodiment of the display device according to the invention.

FIG. 1 is a perspective view illustrating an exemplary embodiment of a display device DD according to the invention. FIG. 2 is an exploded perspective view illustrating an exemplary embodiment of the display device DD according to the invention.

As illustrated in FIG. 1, the display device DD may display an image through a display surface DD-IS. As illustrated in FIG. 1, the display surface DD-IS may include a display area DD-DA and a non-display area DD-NDA. The display area DD-DA and the non-display area DD-NDA are distinguished depending on whether an image is displayed. The non-display area DD-NDA is an area in which an image is not displayed.

As illustrated in FIG. 1, the non-display area DD-NDA may surround the display area DD-DA. However, the invention is not limited thereto. In an exemplary embodiment, the display area DD-DA and the non-display area DD-NDA may be relatively designed in shape, for example.

In an exemplary embodiment of the invention, the non-display area DD-NDA may have an island shape disposed inside the display area. The non-display area DD-NDA may have an area less than that of the display area DD-DA and overlap a camera module, a photo sensor, and an infrared sensor. A transmissive area through which an optical signal is transmitted may be provided in the non-display area DD-NDA.

The display surface DD-IS may have a three-dimensional ("3D") shape. The display surface DD-IS may be divided into a plurality of areas according to a shape thereof. The display surface DD-IS may include a non-bending area NBA and a bending area BA. The display device including two bending areas BA is exemplarily illustrated.

The non-bending area NBA provides a front surface of the display device DD, and the bending area BA provides at least a side surface of the display device DD. In an exemplary embodiment, the bending area BA may include a curved area CA and a side area SA. The curved area CA may provide a curved surface, and the side area SA may provide a flat surface. Substantially, the front surface and the side surface of the display device DD are provided by a window WM, which will be described later, and realized by a front surface and a rear surface of the window WM.

The non-bending area NBA, i.e., the front surface of the display device DD, is defined by a first directional axis DR1 and a second directional axis DR2. A normal direction of the front surface of the display device DD, i.e., a thickness direction of the display device DD, indicates a third directional axis DR3. Hereinafter, a front surface (or a top surface) and a rear surface (or a bottom surface) of each of members or units are distinguished by the third directional axis DR3. However, the first to third directional axes DR1, DR2, and DR3 in the exemplary embodiments are only exemplarily illustrated. Hereinafter, the first to third directions may be directions indicated by the first to third directional axes DR1, DR2, and DR3, and designated by the same reference numerals, respectively.

Although the display device DD including three distinguished areas is exemplarily illustrated in an exemplary embodiment, the invention is not limited thereto. In an exemplary embodiment of the invention, the display device DD including the 3D shaped display surface DD-IS having a greater number of distinguished areas may be applied.

In the exemplary embodiment, the display device DD that is applicable to a mobile phone terminal is exemplarily illustrated. Although not shown, an electronic module, a camera module, and a power module, which are disposed (e.g., mounted) on a main board, may be arranged on a bracket or a case in conjunction with the display device DD to constitute the mobile phone terminal. An exemplary embodiment of the display device DD according to the invention may be used for large-sized electronic devices such as televisions and monitors and small and medium-sized electronic devices such as tablet computers, navigation units for vehicles, game consoles, and smart watches.

As illustrated in FIG. 2, the display device DD includes a window WM, an anti-reflection unit RP, an input sensor IS, a display panel DP, a circuit board FPCB, and a protection film LF. In FIG. 2, the adhesive members that attach the members are not illustrated. The circuit board FPCB may be a portion of a driving control module DCM that will be described later.

In FIG. 2, each of the anti-reflection unit RP, the input sensor IS, the display panel DP, and the protection film LF is in a flat sate before being coupled to the window WM. A non-bending area, a curved area, and a side area corresponding to the non-bending area NBA, the curved area CA, and the side area SA of the display device DD in FIG. 1, respectively, may be defined in each of the window WM, the anti-reflection unit RP, the input sensor IS, the display panel DP, and the protection film LF.

As illustrated in FIG. 2, the window WM includes a first area WM-NBA (or a planar area) providing a front surface and a second area WM-BA bent from the first area WM-NBA and providing at least a side surface. The window WM including two second areas WM-BA (or bending areas) is exemplarily illustrated. The first area WM-NBA and the second area WM-BA correspond to the non-bending area NBA and the bending area BA of the display device DD in FIG. 1, respectively.

The anti-reflection unit RP reduces a reflectance of external light incident from above the window WM. The anti-reflection unit RP may include a retarder and/or a polarizer. In an exemplary embodiment, the retarder may be a film type or a liquid crystal coating type, and include a $\lambda/2$ retarder and/or a $\lambda/4$ retarder, for example. The polarizer also may be a film type or a liquid crystal coating type. The film type may include a flexible synthetic resin film, and the liquid crystal coating type may include liquid crystals arranged in a predetermined arrangement. Each of the retarder and the polarizer may further include a protection film.

An exemplary embodiment of the anti-reflection unit RP according to the invention may include color filters. The color filters may have a predetermined arrangement. The arrangement of the color filters may be determined in consideration of emitted colors of pixels included in the display panel DP. The anti-reflection unit RP may further include a black matrix adjacent to the color filters. The anti-reflection unit RP may further include an insulation layer.

An exemplary embodiment of the anti-reflection unit RP according to the invention may include a destructive interference structure. In an exemplary embodiment, the destructive interference structure may include a first reflection layer and a second reflection layer, which are disposed on different layers from each other, for example. First reflected light and second reflected light, which are reflected by the first reflection layer and the second reflection layer, respectively, may be destructively interfered by each other, and thus a reflectance of external light may be reduced.

The input sensor IS acquires coordinates information of an external input (e.g., a touch event). The input sensor IS includes a plurality of electrodes crossing each other. The input sensor IS may detect an external input in a capacitive method, an electromagnetic induction method, or an ultrasonic detection method.

The display panel DP may be an organic light emitting display panel. The display panel DP includes a pixel area PXA in which a pixel PX is disposed and a non-pixel area NPXA disposed adjacent to the pixel area PXA. In the non-pixel area NPXA, the pixel PX is not disposed, and peripheral components such as signal lines and banks are disposed. The pixel area PXA and the non-pixel area NPXA may correspond to the display area DD-DA (refer to FIG. 1) and the non-display area DD-NDA (refer to FIG. 1), respectively. In this specification, an expression of "an area/portion corresponds to an area/portion" represents an expression of "overlap each other", which is not limited to a state of having the same area.

The pixel PX may be provided in plural, and the plurality of pixels PX may be connected to corresponding signal lines, respectively. The pixel PX may include a first thin-film transistor ("TFT") TR1, a second TFT TR2, a capacitor CP, and a light emitting element ELD. However, the invention is not limited to the driving circuit of the pixel PX in FIG. 2.

The first TFT TR1 is connected to a gate line GL and a data line DL. The light emitting element ELD receives a power voltage provided from a power line PL. Pads connected to the signal lines such as the data line DL and the power line PL are disposed in the non-pixel area NPXA. The pad PDD may be unitary with the signal line or disposed on a different layer from the signal line and connected to an end of the signal line through a contact hole passing through the insulation layer.

The driving control module DCM may include a first circuit board FPCB connected to the display panel DP, a second circuit board MPCB connected to the first circuit board FPCB, a first driving chip D-IC disposed (e.g., mounted) to the first circuit board FPCB, and a second driving chip M-IC disposed (e.g., mounted) to the second circuit board MPCB. The first driving chip D-IC may provide a data signal and/or a gate signal to the display panel DP, and provide other control signals. The second driving chip M-IC may include a timing controller converting an image signal into the data signal.

Although not separately shown, a plurality of passive elements and a plurality of active elements may be disposed (e.g., mounted) to the second circuit board MPCB. A driving chip controlling the input detection sensor IS may be disposed (e.g., mounted) to the second circuit board MPCB. The second circuit board MPCB may be a rigid circuit board or a flexible circuit board, and the first circuit board FPCB may be a flexible circuit board. Although not separately shown, the second circuit board MPCB may be electrically connected to another electronic module through a connector.

The protection film LF is disposed below the display panel DP to support and protect the display panel DP. The protection film LF may include a synthetic resin film. Although not separately shown, a lower member may be disposed below the protection film LF. The lower member may include a light shielding member and an elastic member. The light shielding member prevents external light from being permeated to the display panel DP through a rear surface of the display panel DP. The light shielding member may be a black synthetic resin film. The elastic member absorbs an external impact to protect the display panel DP from the external impact. The elastic member may include a foamed synthetic resin, e.g., a foam urethane sheet. Besides, the lower member may further include a metal plate. The lower member may include a plastic bracket or a metal bracket. The above-described bracket may support the display device DD in FIG. 2 in conjunction with other lower members.

FIGS. 3A to 3D are cross-sectional views taken along line I-I' of FIG. 1. FIGS. 3A to 3D illustrate a cross-section defined by the second directional axis DR2 and the third directional axis DR3. FIGS. 3A to 3D are simply illustrated to explain a lamination relationship between components of the display device DD.

An exemplary embodiment of the display device DD according to the invention may include the window WM, the anti-reflection unit RP, the input sensor IS, the display panel DP, and the protection film LF, which are described with reference to FIG. 2. A laminated structure of the anti-reflection unit RP, the input sensor IS, and the display panel DP may be defined as a display module DM. One of the anti-reflection unit RP and the input sensor IS may be omitted from the display module DM.

At least some of the anti-reflection unit RP, the input sensor IS, and the display panel DP may be provided through a continuous process or may be coupled to each other by an adhesive member. In FIGS. 3A to 3D, an adhesive member AM is illustrated. In an exemplary embodiment, the adhesive member AM may be a transparent adhesive member such as a pressure sensitive adhesive film ("PSA"), an optically clear adhesive film ("OCA"), or an optically clear resin ("OCR").

Among the anti-reflection unit RP and the input sensor IS that are described with reference to FIG. 2, a component provided through a continuous process with another component is expressed by a "layer". Among the anti-reflection unit RP and the input sensor IS, a component coupled with another component through an adhesive member is expressed by a "panel". The panel may include a base layer providing a base surface, e.g., a synthetic resin film, a composite material film, or a glass substrate. However, the "layer" may not include the base layer. In other words, the above-described units expressed as the "layer" is disposed on a base surface provided by another unit. The anti-reflection unit RP and the input sensor IS may be referred to as an anti-reflection panel RPP and an input sensing panel ISP or an anti-reflection layer RPL and an input sensing layer ISL according to whether a base layer exists or not.

Figure 3A:
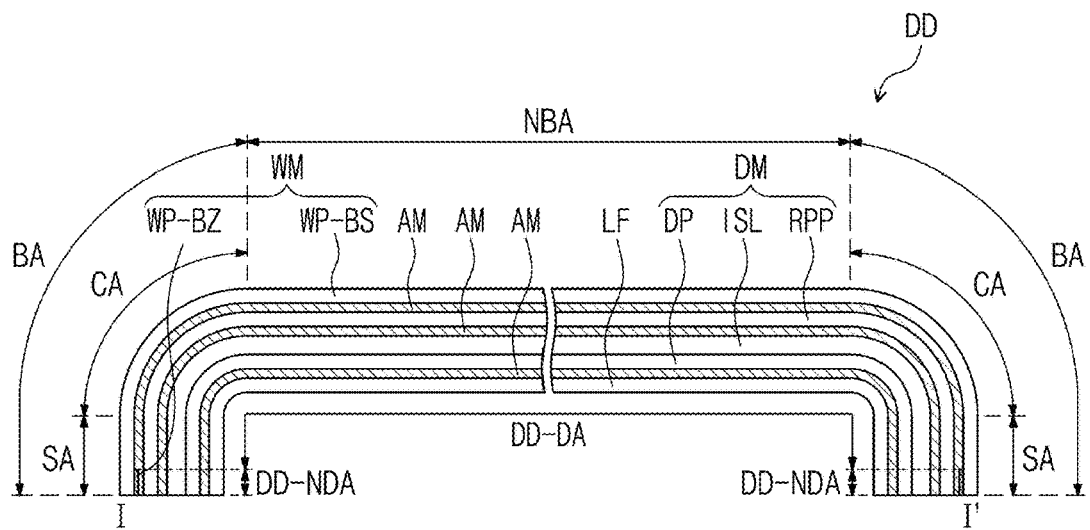
FIGS. 3A to 3D are cross-sectional views taken along line I-I' of FIG. 1.

As illustrated in FIG. 3A, the display device DD may include a window WM, an anti-reflection panel RPP, an input sensing layer ISL, a display panel DP, and a protection film LF. The input sensing layer ISL is directly disposed on the display panel DP. In this specification, an expression of "B component is directly disposed on A component" represents that an additional adhesive layer/adhesive member is not disposed between the A component and the B component. The B component may be provided on a base surface provided by the A component through a continuous process after the A component is provided.

An adhesive member is disposed between the input sensing layer ISL and the anti-reflection panel RPP, between the anti-reflection panel RPP and the window WM, and between the display panel DP and the protection film LF.

An exemplary embodiment of the window WM according to the invention includes a base layer WP-BS and a bezel pattern WP-BZ. The base layer WP-BS may include a glass substrate and/or a synthetic resin film. However, the invention is not limited to the base layer WP-BS having a single layer. In an exemplary embodiment, the base layer WP-BS may include two or more films coupled to each other through an adhesive member, for example.

The bezel pattern WP-BZ partially overlaps the base layer WP-BS. The bezel pattern WP-BZ may be disposed on a rear surface of the base layer WP-BS to define a bezel area, i.e., the non-display area DD-NDA, of the display device DD.

Figure 3B:
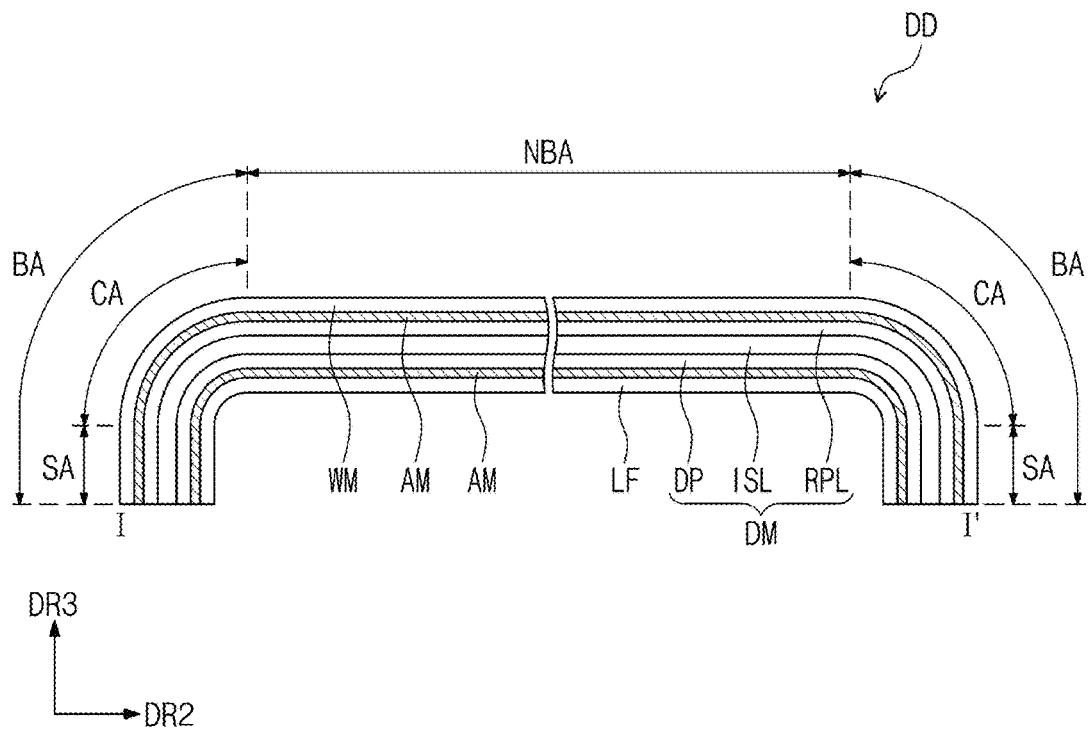
Figure 3C:
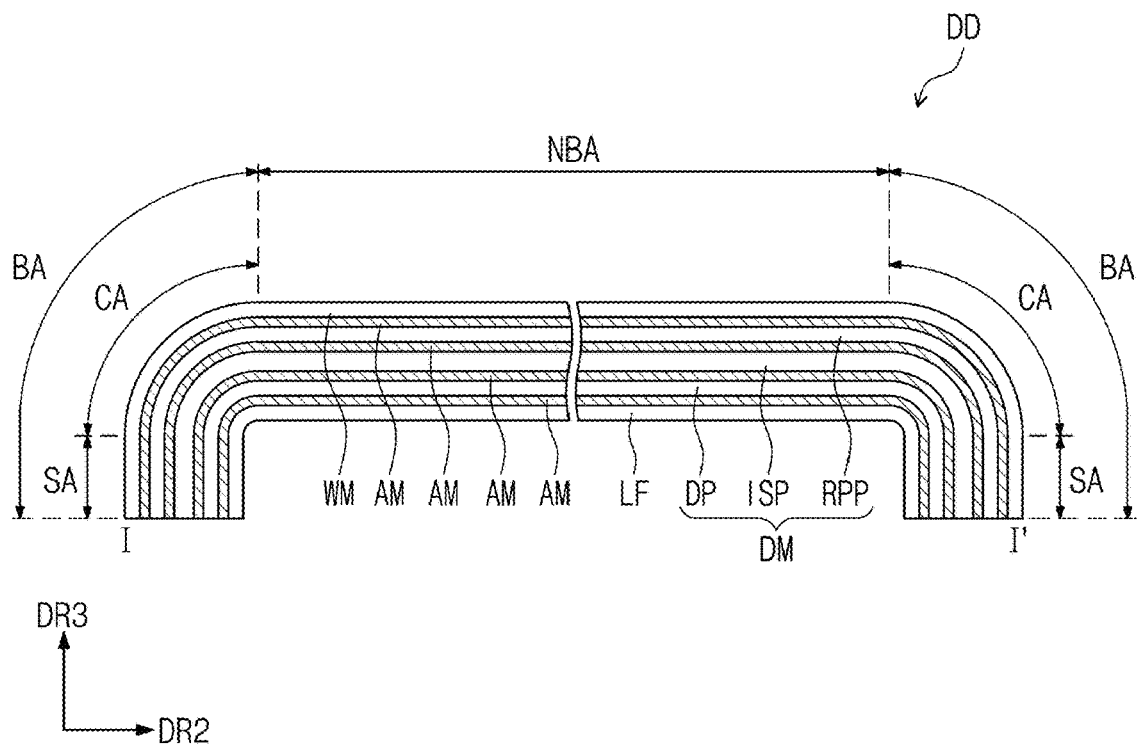
Figure 3D:
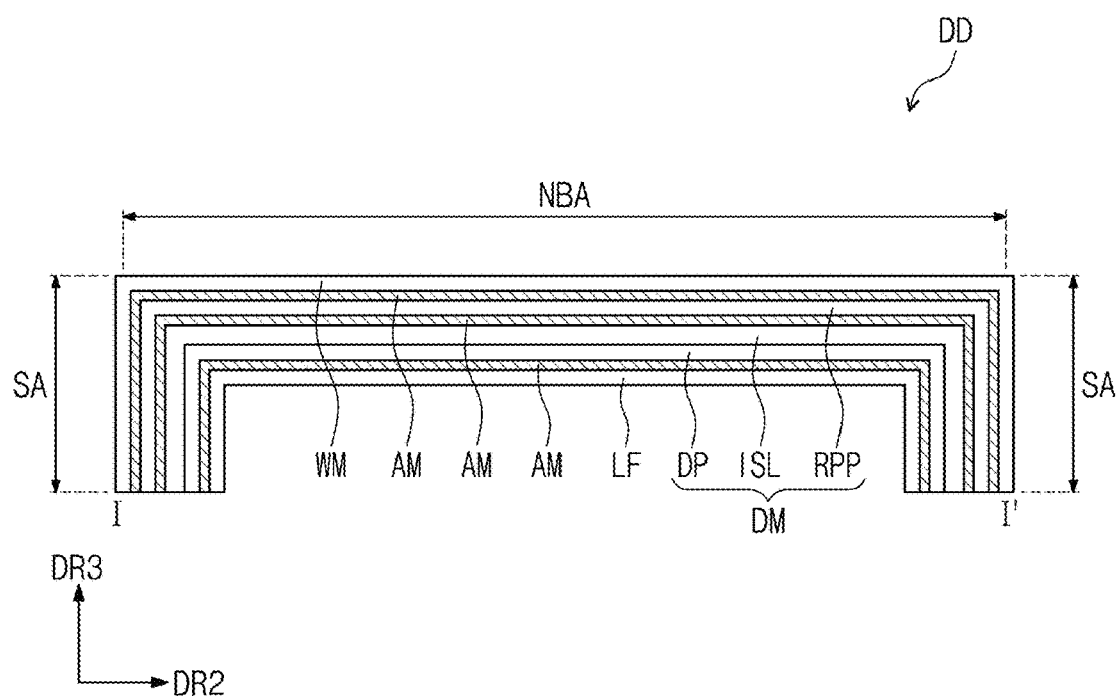

The bezel pattern WP-BZ, as a colored organic layer, may be provided by, e.g., a coating method. The bezel pattern WP-BZ may include a plurality of organic layers. In some of the organic layers, a predetermined pattern may be defined. Although not separately shown, the window WM may further include a functional coating layer disposed on a front surface of the base layer WP-BS. The functional coating layer may include an anti-fingerprint layer, an anti-reflection layer, and a hard coating layer. In FIGS. 3B to 3D, the window WM is simply illustrated without division between the base layer WP-BS and the bezel pattern WP-BZ.

As illustrated in FIG. 3B, the display device DD may include a window WM, an anti-reflection layer RPL, an input sensing layer ISL, a display panel DP, and a protection film LF. A laminated sequence of the input sensing layer ISL and the anti-reflection layer RPL may be changed. As illustrated in FIG. 3C, the display device DD may include a window WM, an anti-reflection panel RPP, an input sensing panel ISP, a display panel DP, and a protection film LF. A laminated sequence of the anti-reflection panel RPP and the input sensing layer ISL may be changed.

In FIG. 3D, the display device DD having the same laminated structure as that in FIG. 3A is illustrated. However, the curved area CA is omitted, and the display device DD includes a non-bending area NBA and a side area SA. In an exemplary embodiment of the invention, the display device DD having the same shape as that in FIG. 3D may have the laminated structure in FIGS. 3B and 3C.

Figure 4A:
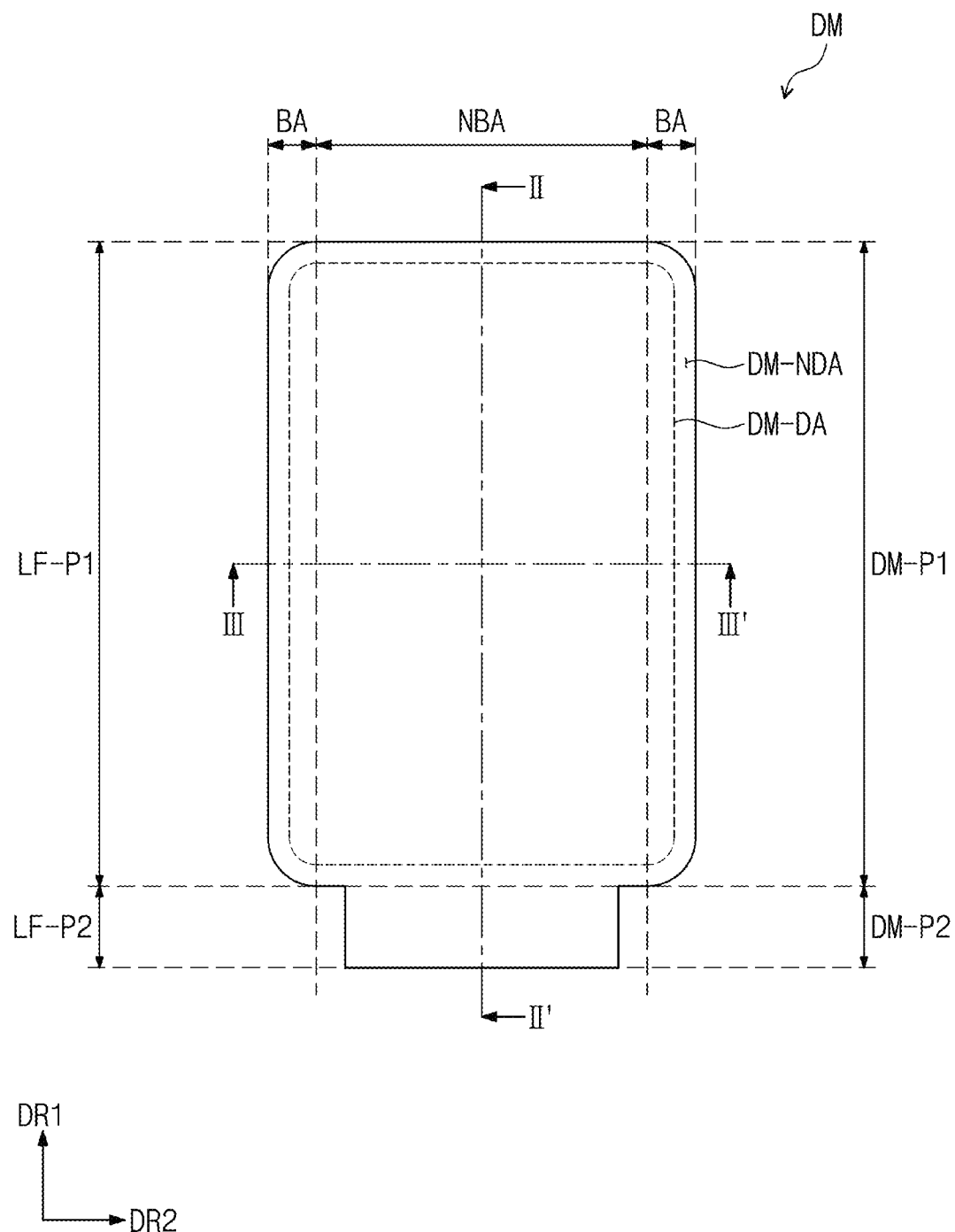
FIG. 4A is a plan view illustrating an exemplary embodiment of a display module according to the invention.
Figure 4B:
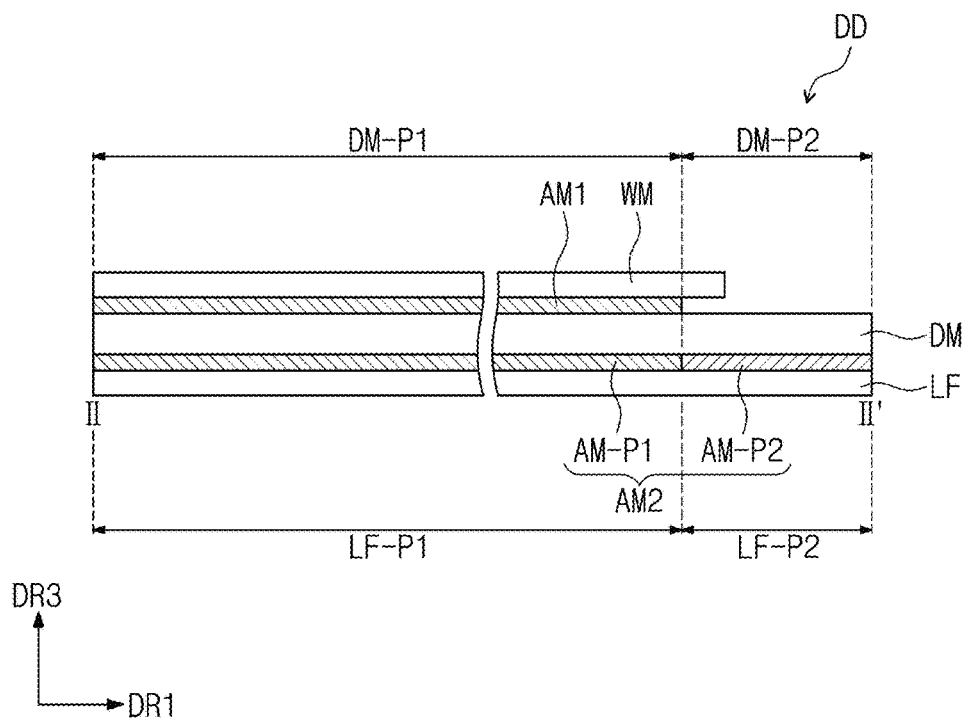
FIG. 4B is a cross-sectional view taken long line II-II' of FIG. 4A.
Figure 4C:
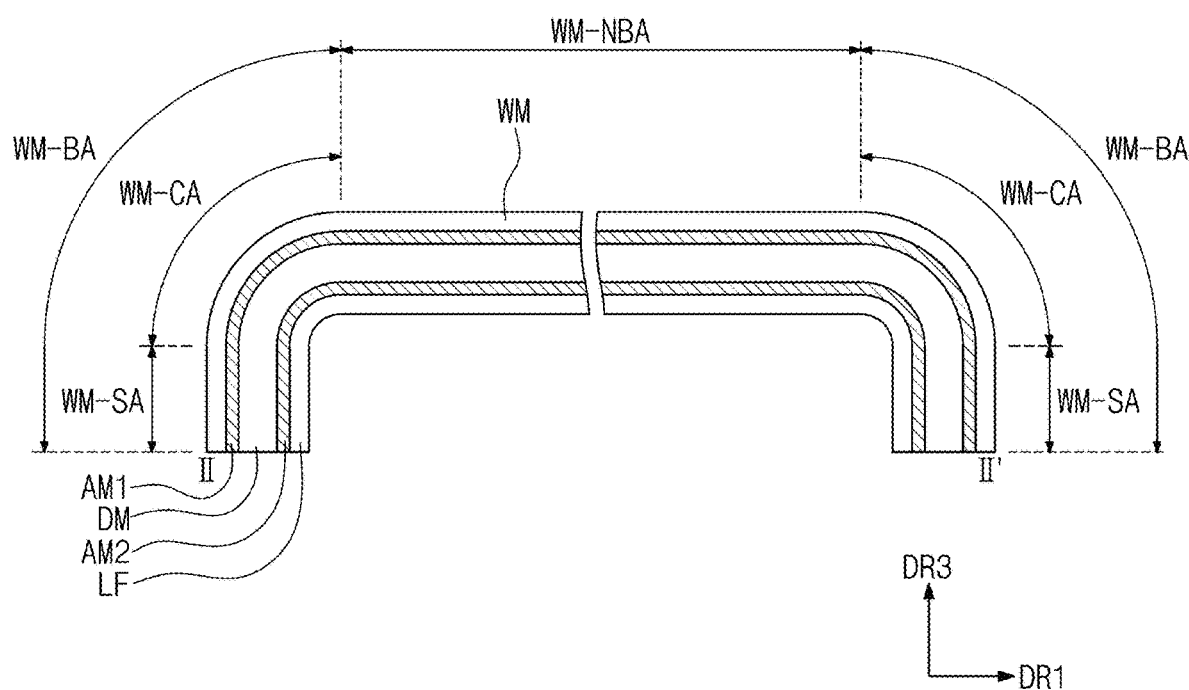
FIG. 4C is a cross-sectional view taken long line III-III' of FIG. 4A.
Figure 4D:
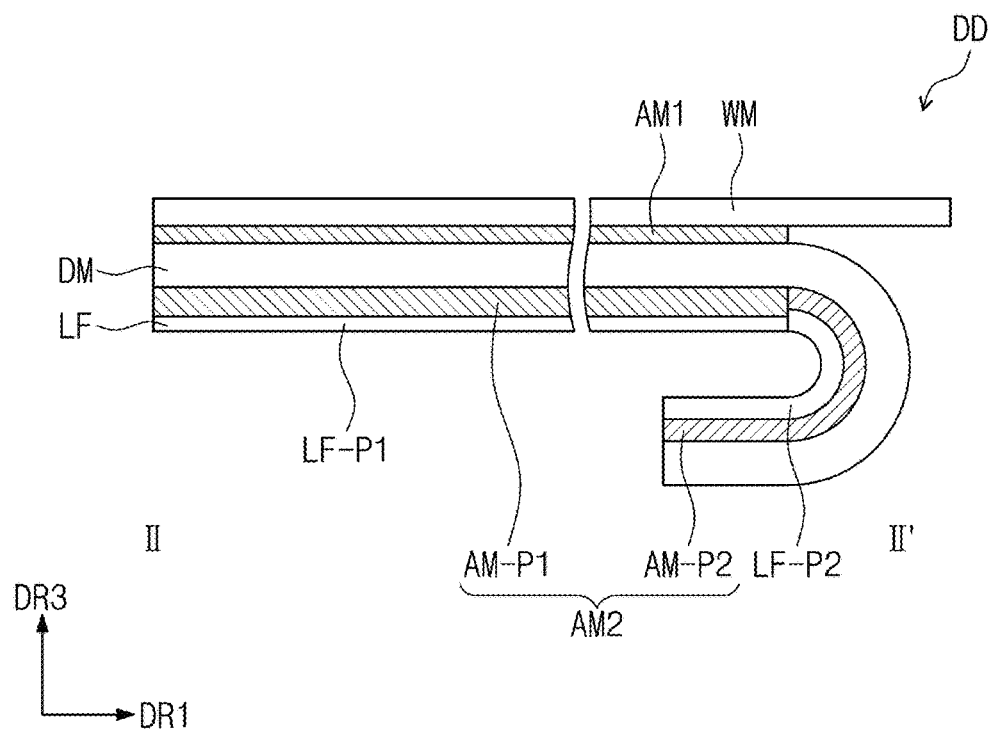
FIGS. 4D to 4F are cross-sectional views taken long line II-II' of FIG. 4A.
Figure 4E:
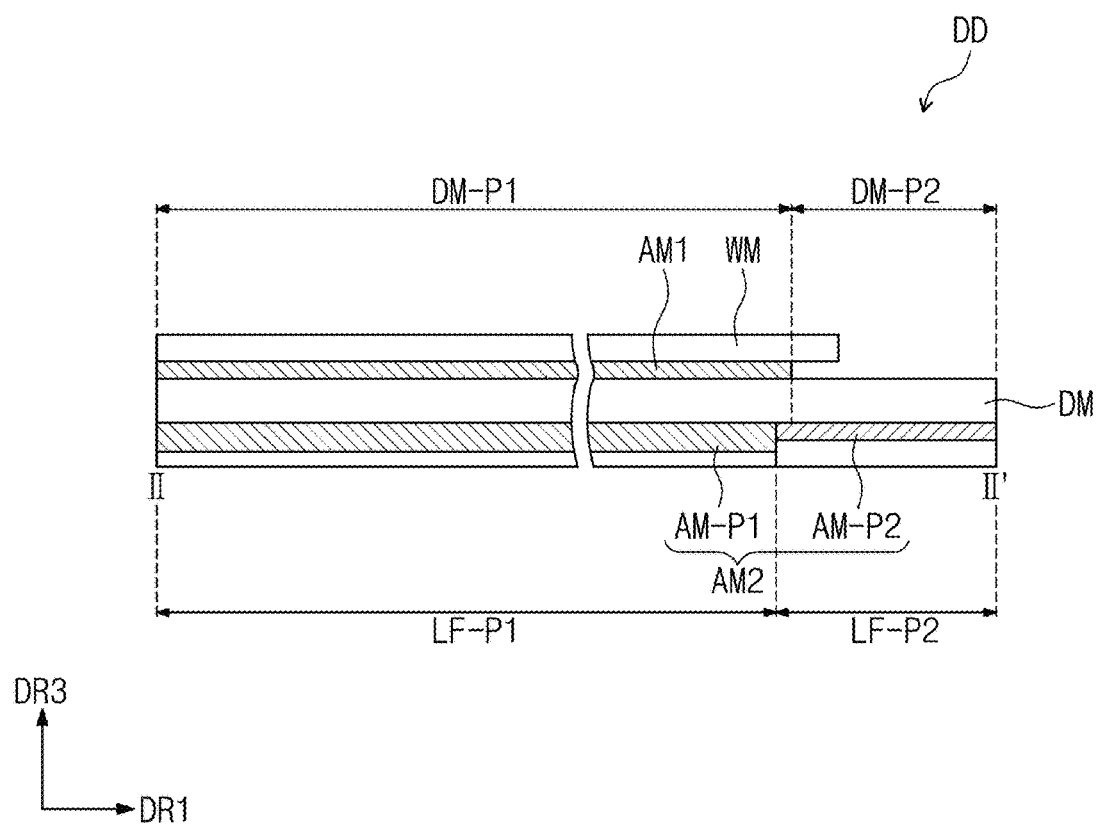
Figure 4F:
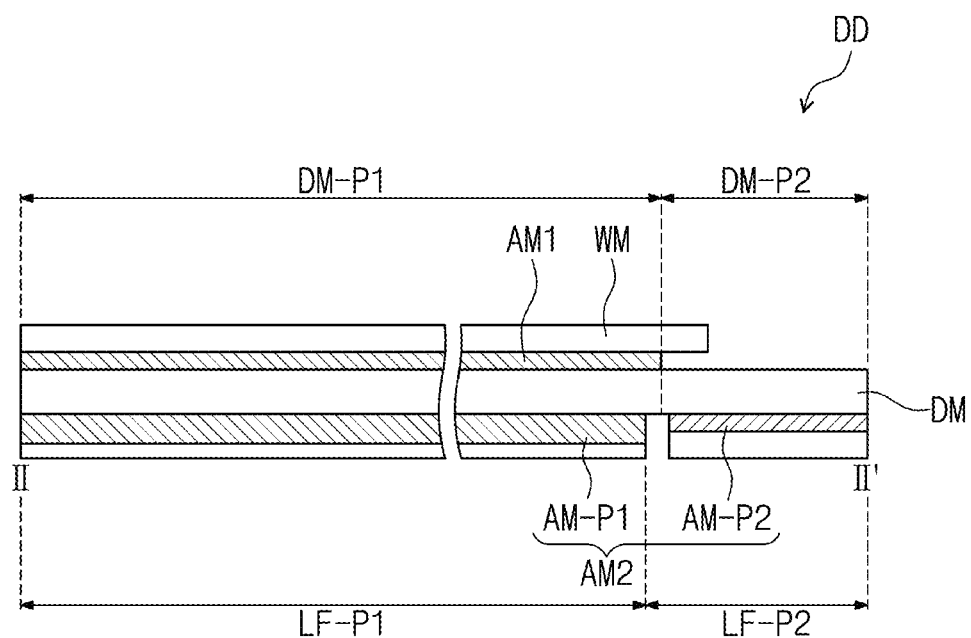
Figure 4F:
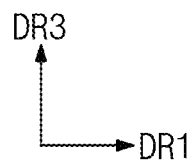

FIG. 4A is a plan view illustrating an exemplary embodiment of the display module DM according to the invention. FIG. 4B is a cross-sectional view taken long line II-II' of FIG. 4A. FIG. 4C is a cross-sectional view taken long line III-III' of FIG. 4A. FIGS. 4D to 4F are cross-sectional views taken long line II-II' of FIG. 4A. In FIGS. 4B to 4F, the window WM is additionally illustrated in comparison with FIG. 4A.

In FIG. 4A, a display area DM-DA and a non-display area DM-NDA of the display module DM, which correspond to the display area DD-DA and the non-display area DD-NDA in FIG. 1, are illustrated. As illustrated in FIGS. 4A to 4F, the display module DM includes a first portion DM-P1 coupled to the window WM and a second portion DM-P2 extending from the first portion DM-P1. In FIGS. 4B to 4F, the display module DM is simply illustrated.

The first portion DM-P1 may be an area coupled to the window WM. The first portion DM-P1 may be a partial area of the display module DM, which contacts the first adhesive member AM1. The second portion DM-P2 may be an area that is not coupled to the window WM. The second portion DM-P2 extends to the outside of the first portion DM-P1 on a plane. As illustrated in FIGS. 4B, 4C, 4E, and 4F, at least one portion of the second portion DM-P2 in an unfolded state does not overlap the window WM.

The display panel DP (refer to FIGS. 2 to 3D) includes portions corresponding to the first portion DM-P1 and the second portion DM-P2. Although each of the anti-reflection unit RP (refer to FIG. 2) and the input sensor IS (refer to FIG. 2) may include the portions corresponding to the first portion DM-P1 and the second portion DM-P2, the invention is not limited thereto. In an exemplary embodiment, each of the anti-reflection unit RP and the input sensor IS may include only the portion corresponding to the first portion DM-P1, for example. The circuit board FPCB (refer to FIG. 2) may be coupled to one portion of the display panel DP corresponding to the second portion DM-P2.

The second portion DM-P2 has an area less than that of the first portion DM-P1. The second portion DM-P2 may have a width in the second directional axis DR2 less than that of the first portion DM-P1. The first portion DM-P1 may overlap the display area DD-DA (refer to FIG. 1) and the non-display area DD-NDA (refer to FIG. 1), and the second portion DM-P2 may correspond to the non-display area DD-NDA.

The protection film LF includes a first film portion LF-P1 corresponding to the first portion DM-P1 and a second film portion LF-P2 corresponding to the second portion DM-P2. The second film portion LF-P2 has an area less than that of the first film portion LF-P1. In an exemplary embodiment of the invention, the first portion DM-P1 and the first film portion LF-P1 may have the same shape as each other. However, the invention is not limited thereto.

The second adhesive member AM2 coupling the protection film LF and the display module DM includes adhesive members that are different for each area. Referring to FIGS. 4B to 4F, a first area adhesive member AM-P1 couples the first portion DM-P1 and the first film portion LF-P1, and a second area adhesive member AM-P2 couples the second portion DM-P2 and the second film portion LF-P2. The second area adhesive member AM-P2 has an elastic modulus greater than that of the first area adhesive member AM-P1. In an exemplary embodiment, the first area adhesive member AM-P1 may have an elastic modulus of about 0.01 MPa to about 10 MPa, and the second area adhesive member AM-P2 may have an elastic modulus of about 1 MPa to about 200 MPa, for example. As adhesive members different for each area are provided, a crack defect of the window is reduced, and a bonding characteristic of the circuit board FPCB (refer to FIG. 2) may improve. Detailed description thereof will be described with reference to a manufacturing method.

Referring to FIGS. 4A to 4C, the first area adhesive member AM-P1 overlaps at least an area corresponding to the non-bending area NBA of each of the first portion DM-P1 and the first film portion LF-P1.

Referring to FIGS. 4B to 4D, the first area adhesive member AM-P1 may be disposed over the entire first portion DM-P1 and first film portion LF-P1. Referring to FIGS. 4E and 4F, the first area adhesive member AM-P1 may not overlap one portion of each of the first portion DM-P1 and the first film portion LF-P1.

Referring to FIGS. 4A to 4F, the second area adhesive member AM-P2 may be disposed over the entire second portion DM-P2 and second film portion LF-P2. However, the invention is not limited thereto. In an exemplary embodiment, the second area adhesive member AM-P2 may overlap only one portion of each of the second portion DM-P2 and the second film portion LF-P2, for example. The second area adhesive member AM-P2 overlaps the pads PDD (refer to FIG. 2).

As illustrated in FIGS. 4B and 4C, the protection film LF may have an integrated shape. The protection film LF may have a uniform thickness. The first area adhesive member AM-P1 and the second area adhesive member AM-P2 may have the substantially same thickness as each other.

As the first area adhesive member AM-P1 having a small modulus and a great thickness is disposed on the curved area CA, the side area SA, and a partial area of the non-bending area NBA adjacent to the curved area CA, a stress provided from the display module DM and the first film portion LF-P1 to the second area WM-BA of the window WM may be reduced.

As illustrated in FIGS. 4D and 4F, the first film portion LF-P1 and the second film portion LF-P2 may be films distinguished from each other. The first film portion LF-P1 may have a thickness greater than that of the second film portion LF-P2. In an exemplary embodiment, the first area adhesive member AM-P1 may have a thickness of about 1 micrometer (μm) to about 100 μm, and the second area adhesive member AM-P2 may have a thickness of about 1 μm to about 100 μm, for example. The first film portion LF-P1 may have a thickness less than that of the second film portion LF-P2. A sum of thicknesses of the first area adhesive member AM-P1 and the first film portion LF-P1 may be substantially the same as that of thicknesses of the second area adhesive member AM-P2 and the second film portion LF-P2.

As illustrated in FIG. 4D, the second portion DM-P2 may be bent to face the first portion DM-P1. The second portion DM-P2 may be bent at a predetermined curvature.

As illustrated in FIG. 4E, the second area adhesive member AM-P2 may overlap the first portion DM-P1 and a portion of the first film portion LF-P1. However, the second area adhesive member AM-P2 does not overlap the area corresponding to the non-bending area NBA of each of the first portion DM-P1 and the first film portion LF-P1.

As illustrated in FIG. 4F, on a plane, the first film portion LF-P1 is spaced apart from the second film portion LF-P2. On the plane, the first area adhesive member AM-P1 and the second area adhesive member AM-P2 may be also spaced apart from each other. A spaced space reduces a stress generated when the second portion DM-P2 is bent.

Figure 5A:
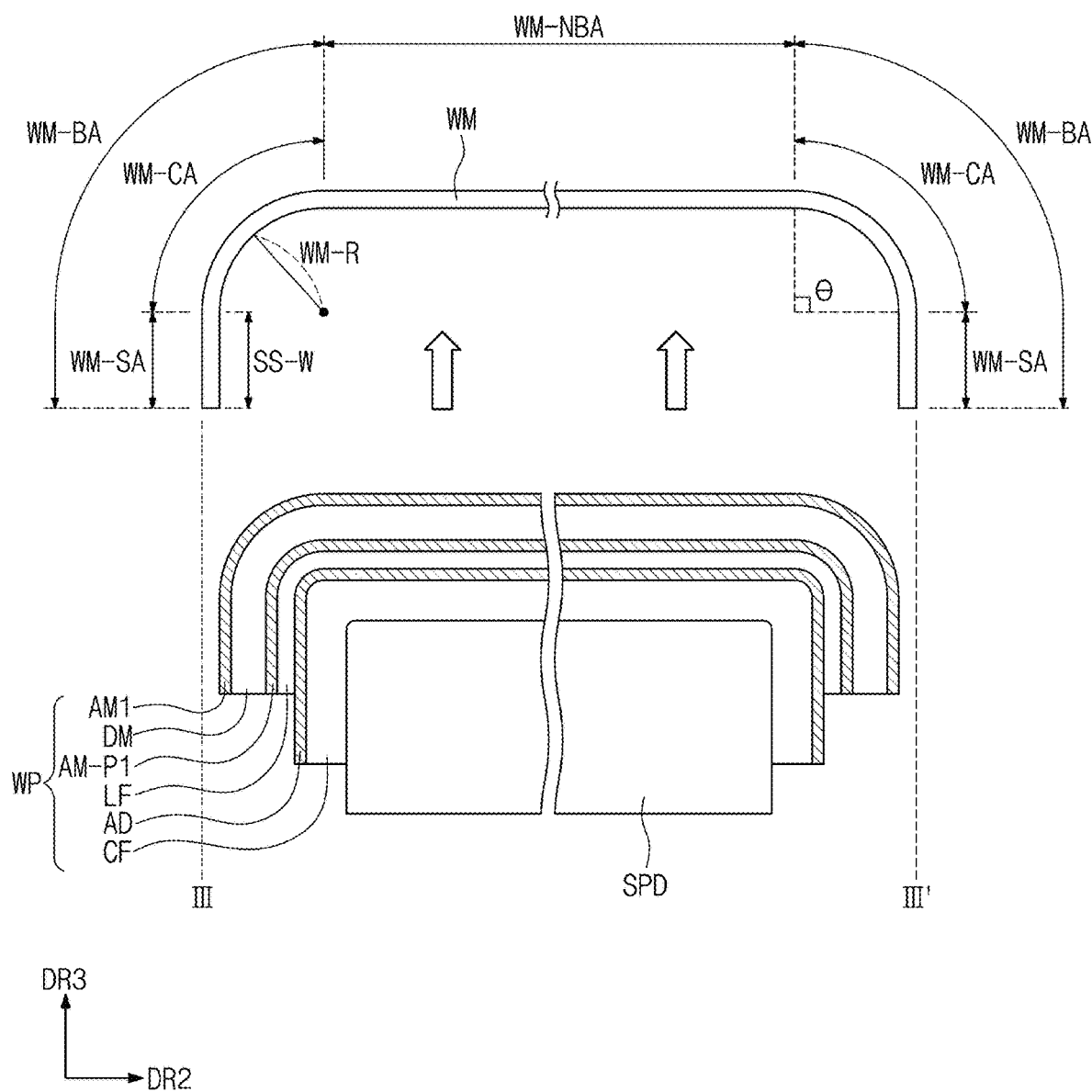
FIGS. 5A to 5G are cross-sectional views illustrating an exemplary embodiment of a process of manufacturing a display device according to the invention.
Figure 5B:
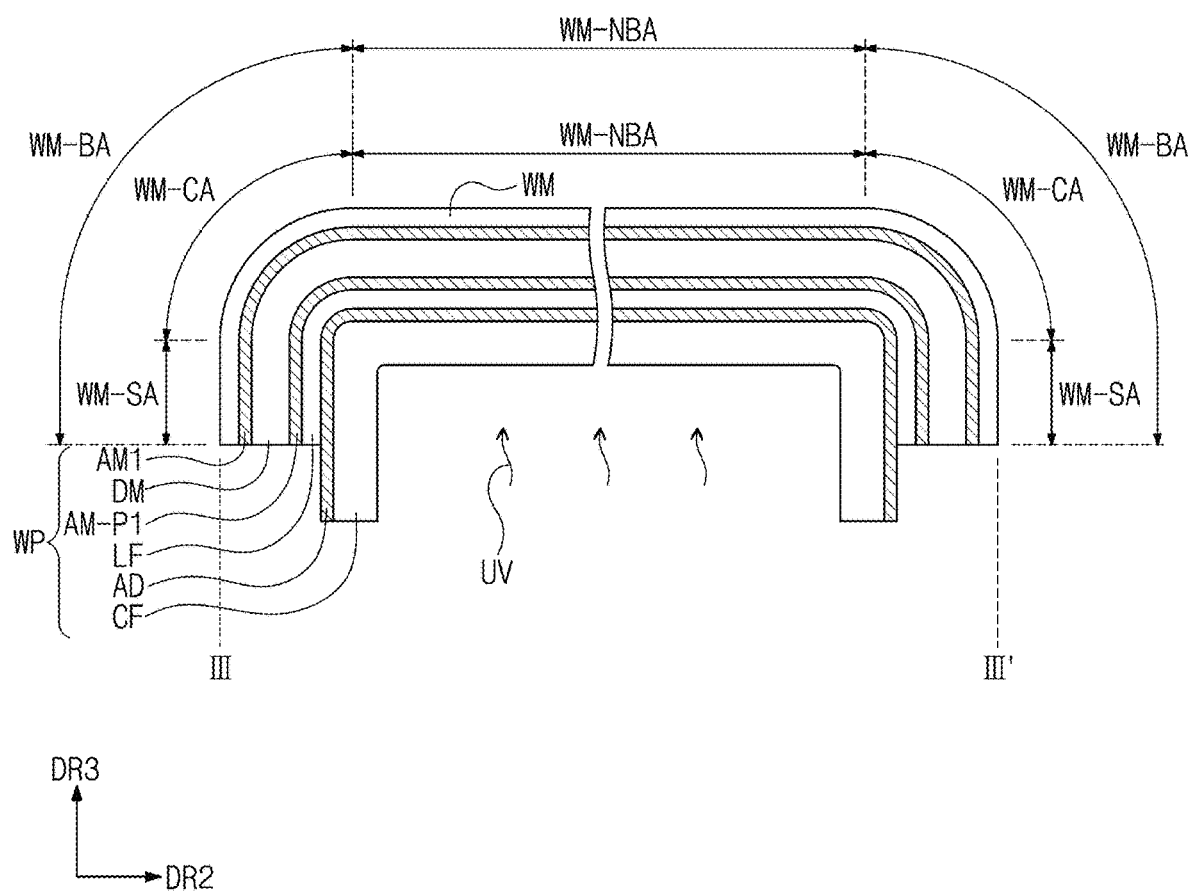
Figure 5C:
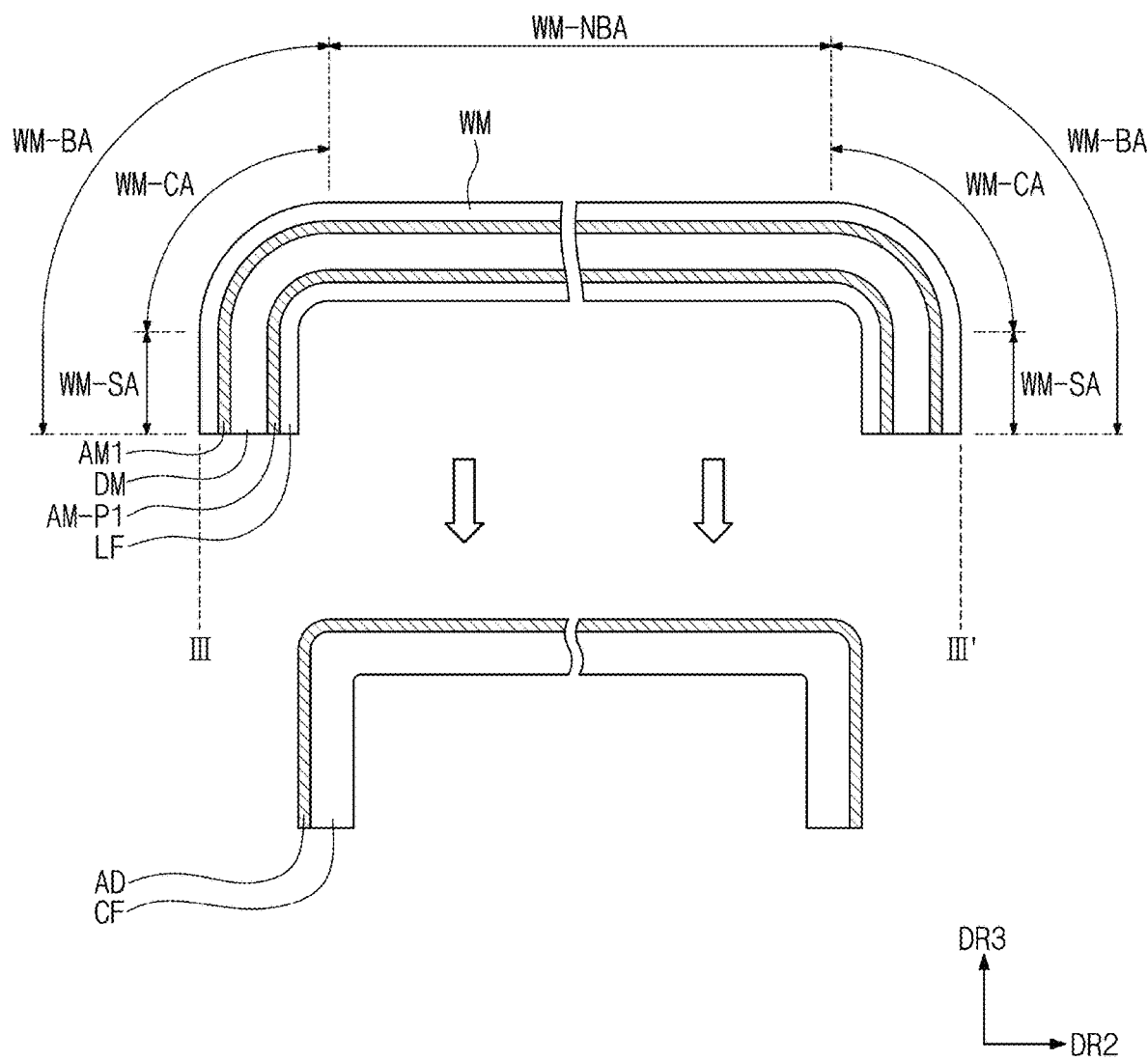

FIGS. 5A to 5G are cross-sectional views illustrating an exemplary embodiment of a process of manufacturing a display device according to the invention. FIGS. 5A to 5C are cross-sectional views taken along line III-III' of FIG. 4A, and FIGS. 5D to 5G are cross-sectional views taken along line II-II' of FIG. 4A. In this exemplary embodiment, a process of manufacturing the display device DD in FIGS. 4B and 4C is exemplarily described.

Figure 5D:
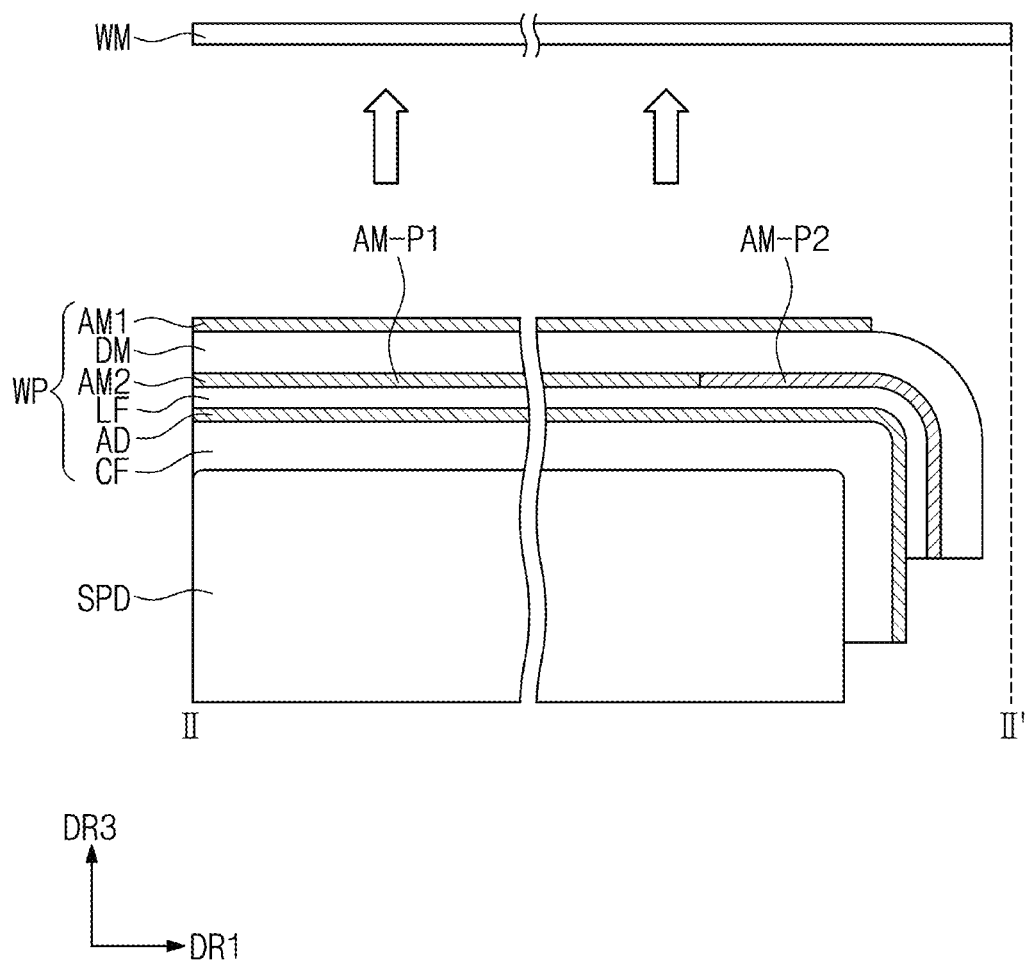

As illustrated in FIGS. 5A and 5D, a window WM is provided. The window WM includes a first area WM-NBA and a second area WM-BA. The second area WM-BA may include a curved area WM-CA and a side area WM-SA corresponding to the curved area CA and the side area SA of the display device DD (refer to FIG. 1), respectively. In an exemplary embodiment, the curved area WM-CA may have a curvature radius WM-R of about 2 millimeters (mm) to about 5 mm, for example. The curvature radius WM-R may be measured at an outer surface or an inner surface of the window WM.

In an exemplary embodiment, an angle between the first area WM-NBA and the side area WM-SA may be about 80 degrees (°) to about 90°, for example. In an exemplary embodiment, a width SS-W in the third directional axis DR3 of a side surface provided by the side area WM-SA may be about 4 mm to about 8 mm, for example.

A working panel WP is disposed on a pressing pad SPD. The working panel WP includes a display module DM, a first adhesive member AM1 disposed on a top surface of the display module DM, a protection film LF disposed below the display module DM, a second adhesive member AM2 coupling the display module DM and the protection film LF, a carrier film CF disposed below the protection film LF, and a carrier adhesive member AD coupling the carrier film CF and the protection film LF. The pressing pad SPD may be a silicon pad.

The working panel WP and the window WM are aligned with each other, and then the working panel WP is coupled to the window WM. The first adhesive member AM1 is coupled to the first area WM-NBA and the second area WM-BA.

Thereafter, the carrier adhesive member AD, the carrier film CF, and the pressing pad SPD are detached from the protection film LF.

Figure 5E:
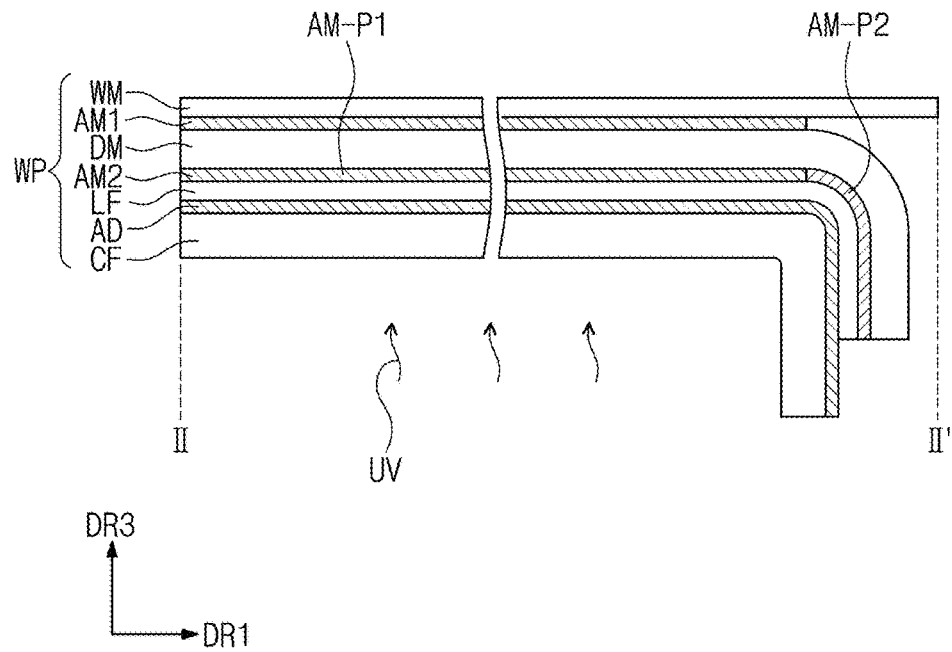

As illustrated in FIGS. 5B and 5E, a photo-curing process of the carrier adhesive member AD after the pressing pad SPD is removed may be selectively performed. An adhesion force of the carrier adhesive member AD may be weakened by irradiating the carrier adhesive member AD with ultraviolet rays UV.

Figure 5F:
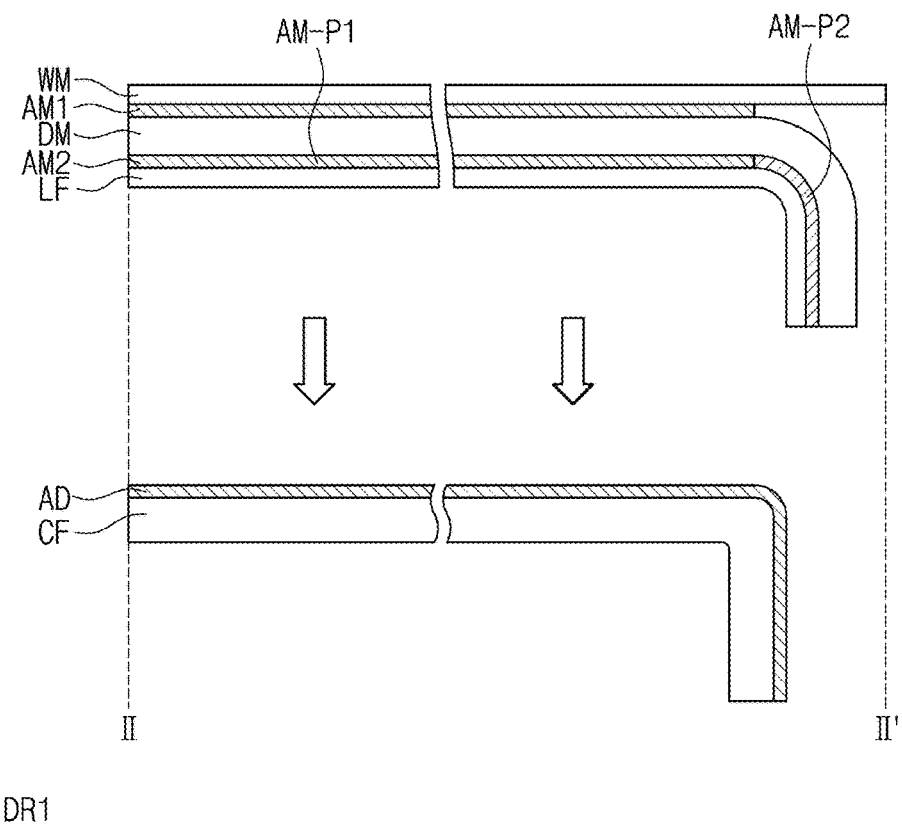

As illustrated in FIGS. 5C and 5F, the carrier adhesive member AD having the weakened adhesive force may be detached from the protection film LF in conjunction with the carrier film CF. In an exemplary embodiment of the invention, the photo-curing process may not be performed. Although the photo-curing process is not performed, as an adhesive member having a relatively weak adhesion force is applied to the carrier adhesive member AD, the carrier adhesive member AD and the carrier film CF may be removed from the protection film LF without delamination of the first adhesive member AM1 and the second adhesive member AM2.

Figure 5G:
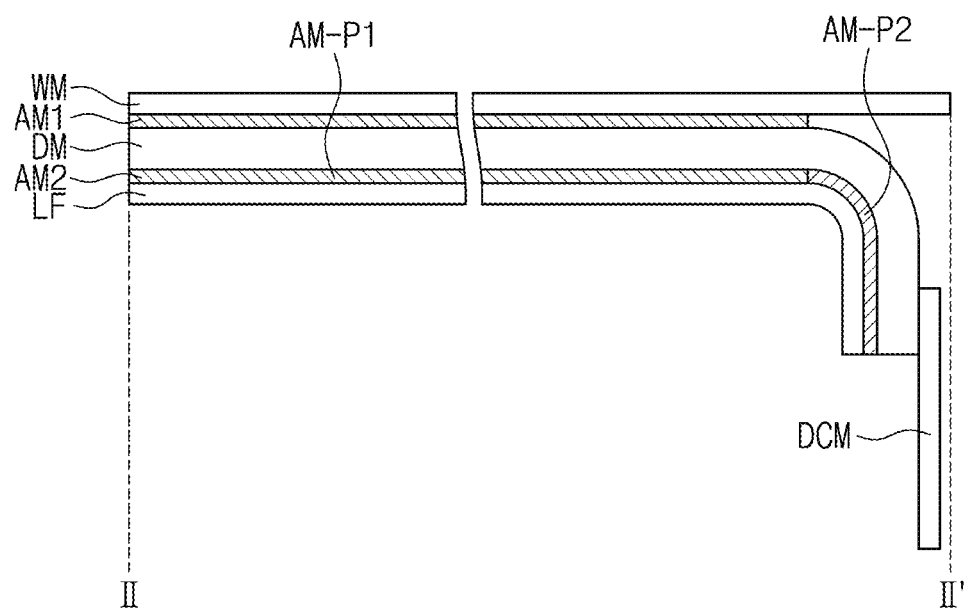

Next, as illustrated in FIG. 5G, a process of bonding a driving control module DCM to the display module DM may be further performed. Also, a process of coupling a lower member to a lower side of the protection film LF may be further performed. However, the invention is not particularly limited to the sequence of the bonding process and the lower member coupling process.

Referring to FIGS. 5A to 5G, as the first area adhesive member AM-P1 having a relatively small elastic modulus is disposed in the bending area WM-BA, a stress applied to the bending area WM-BA of the window WM by the display module DM and the protection film LF may be reduced. As each of the first adhesive member AM1 and the second adhesive member AM2 extends in the bending area WM-BA, the bending stress is reduced.

As the second area adhesive member AM-P2 having a relatively great elastic modulus is disposed between a bonding portion of the display module DM and the protection film LF, the bonding portion of the display module DM may have a relatively great strength in comparison with that of a bending portion of the display module DM. As the strength of the bonding portion of the display module DM is greater than a reference strength, a coupling force between the driving control module DCM and the display module DM may increase, and a defect generated in the bonding process may be reduced.

Figure 6:
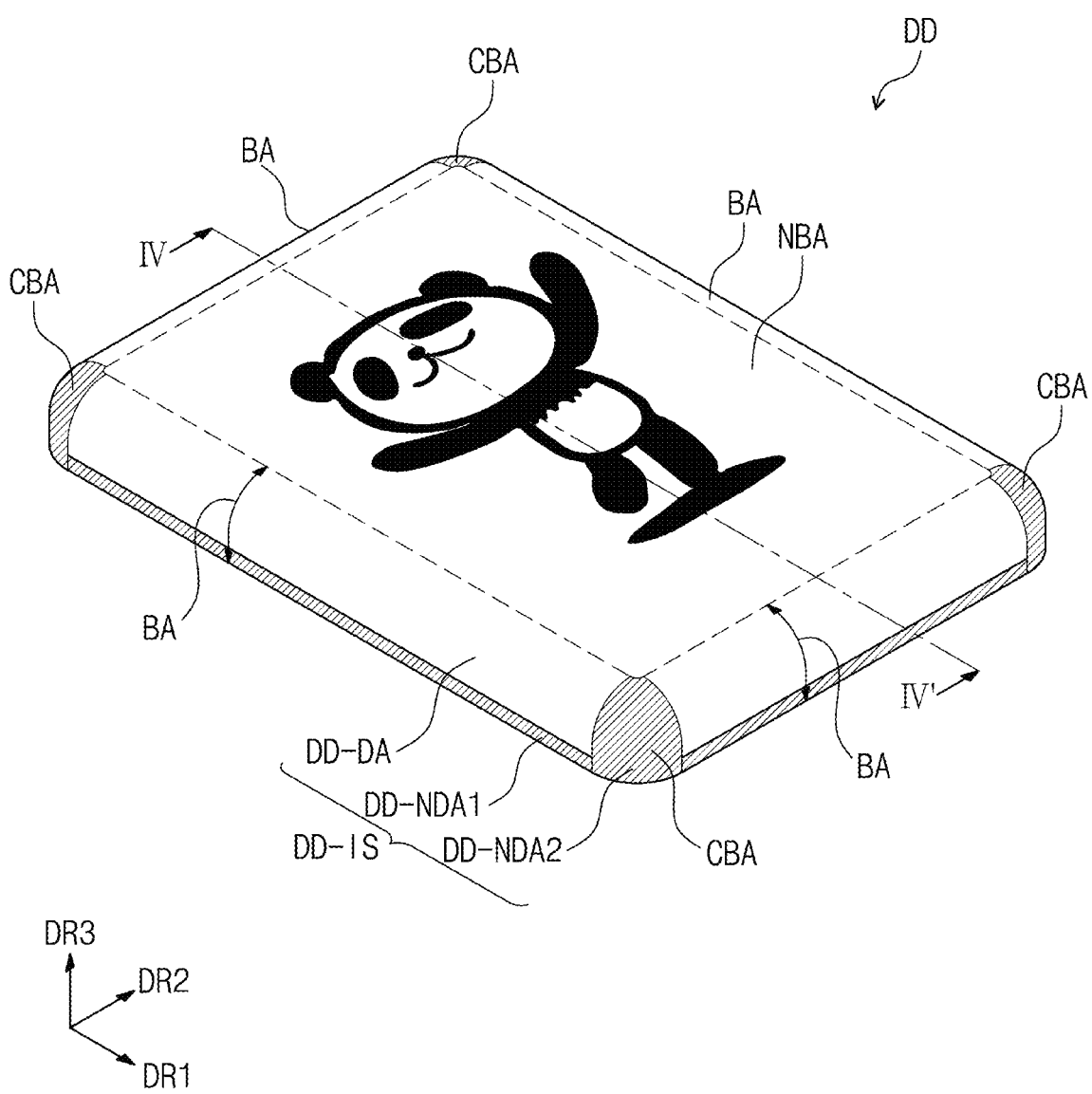
FIG. 6 is a perspective view illustrating an exemplary embodiment of a display device according to the invention.
Figure 7:
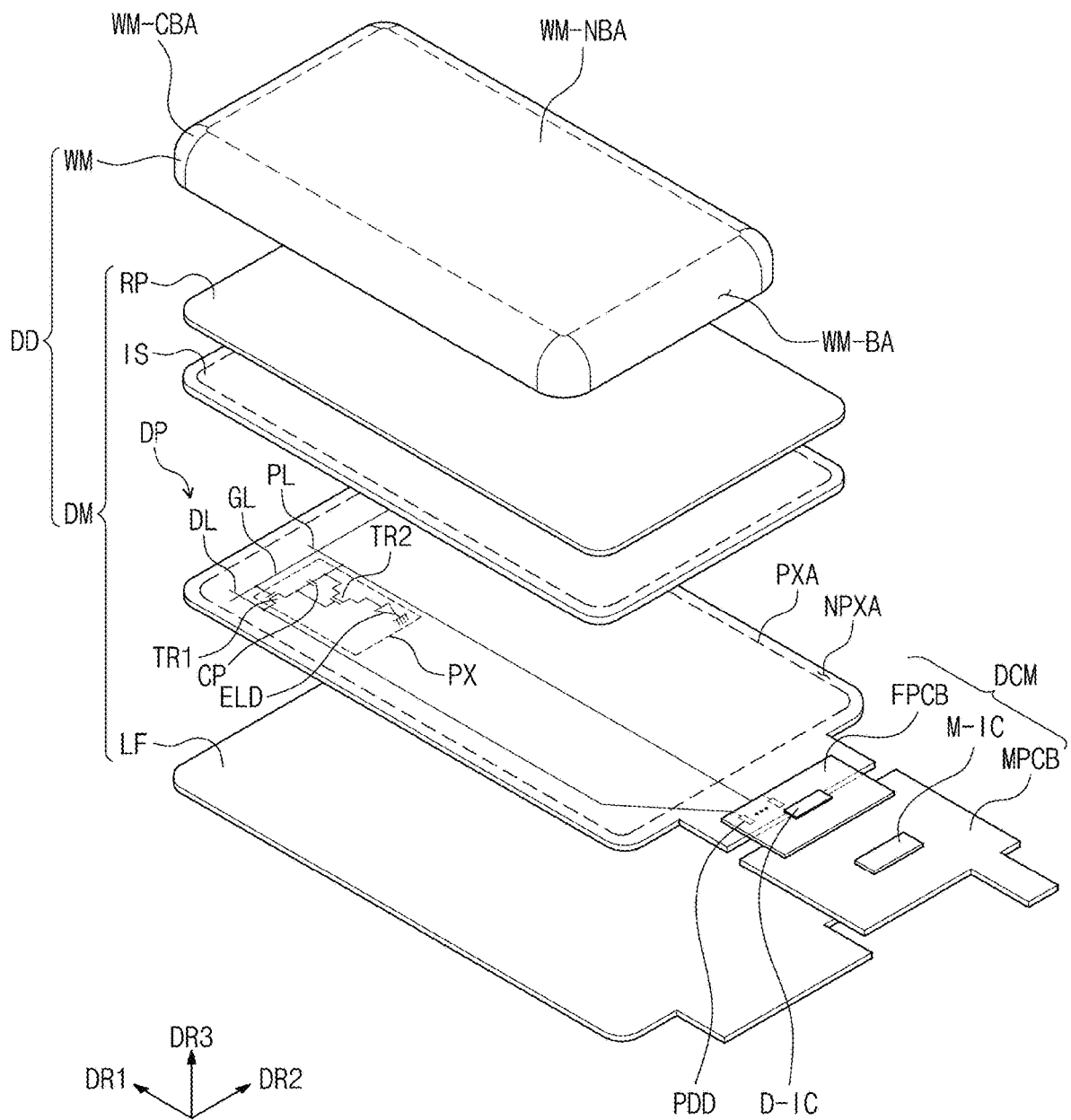
FIG. 7 is an exploded perspective view illustrating an exemplary embodiment of the display device according to the invention.
Figure 8:
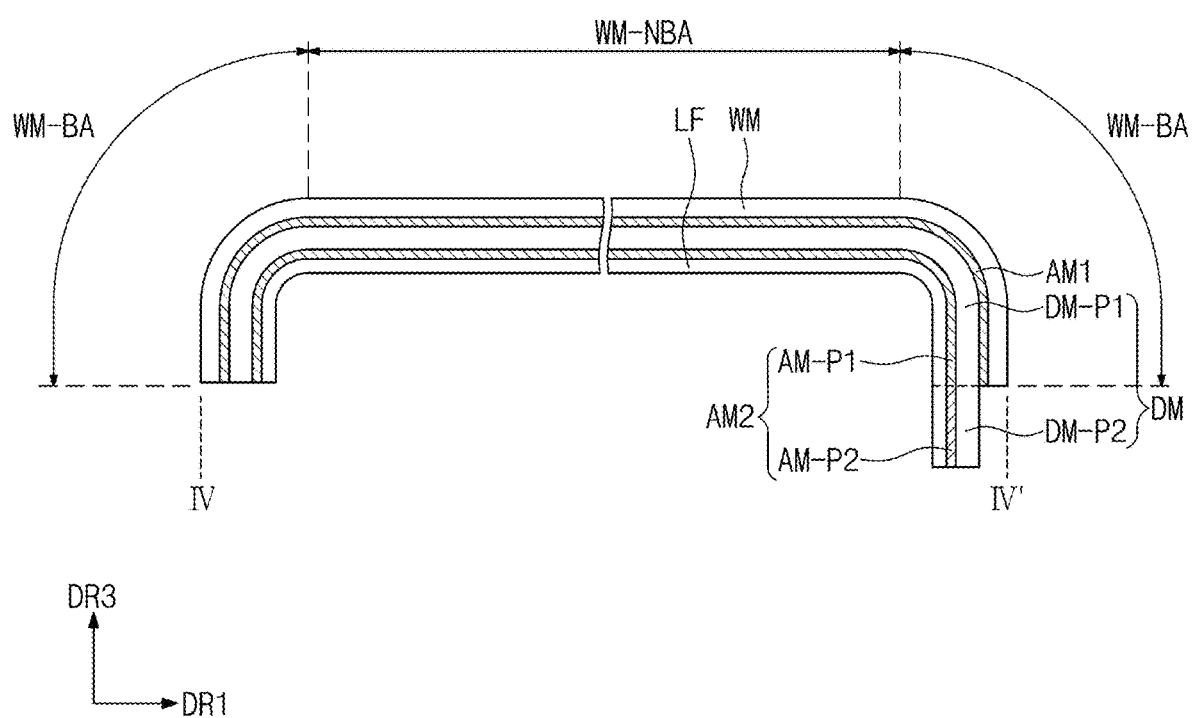
FIG. 8 is a cross-sectional view taken along line IV-IV' of FIG. 6.

FIG. 6 is a perspective view illustrating an exemplary embodiment of a display device DD according to the invention. FIG. 7 is an exploded perspective view illustrating an exemplary embodiment of the display device DD according to the invention. FIG. 8 is a cross-sectional view taken along line IV-IV' of FIG. 6. Hereinafter, detailed descriptions on the same components described with reference to FIGS. 1 to 5F will be omitted.

As illustrated in FIG. 6, a display surface DD-IS includes a display area DD-DA and a plurality of non-display areas DD-NDA1 and DD-NDA2. The plurality of non-display areas DD-NDA1 and DD-NDA2 include a first non-display area DD-NDA1 and a second non-display area DD-NDA2.

The display surface DD-IS may include a non-bending area NBA and four bending areas BA. Also, the display surface DD-IS may include four corner bending areas CBA. Each of the corner bending areas CBA is disposed between two adjacent bending areas BA. At least a portion of the corner bending area CBA may be the non-display area DD-NDA. The four corner bending areas CBA may correspond to four second non-display areas DD-NDA2, respectively. Four first non-display areas DD-NDA1 may correspond to edge areas of the four bending areas BA, respectively.

As illustrated in FIG. 7, a window WM may include a first area WM-NBA (or planar area), four second areas WM-BA (or bending areas), and four third areas WM-CBA (or corner areas). The four second areas WM-BA and the four third areas WM-CBA correspond to the four bending areas BA and the four corner bending areas CBA of the display device DD in FIG. 1, respectively. Two of the four bending areas WM-BA face each other in the first directional axis DR1, and the other two face each other in the second directional axis DR2.

Referring to FIGS. 6 to 8, the display module DM overlaps all of the four bending areas WM-BA. The second portion DM-P2 of the display module DM may protrude to the outside from one of the four bending areas WM-BA.

Figure 9:
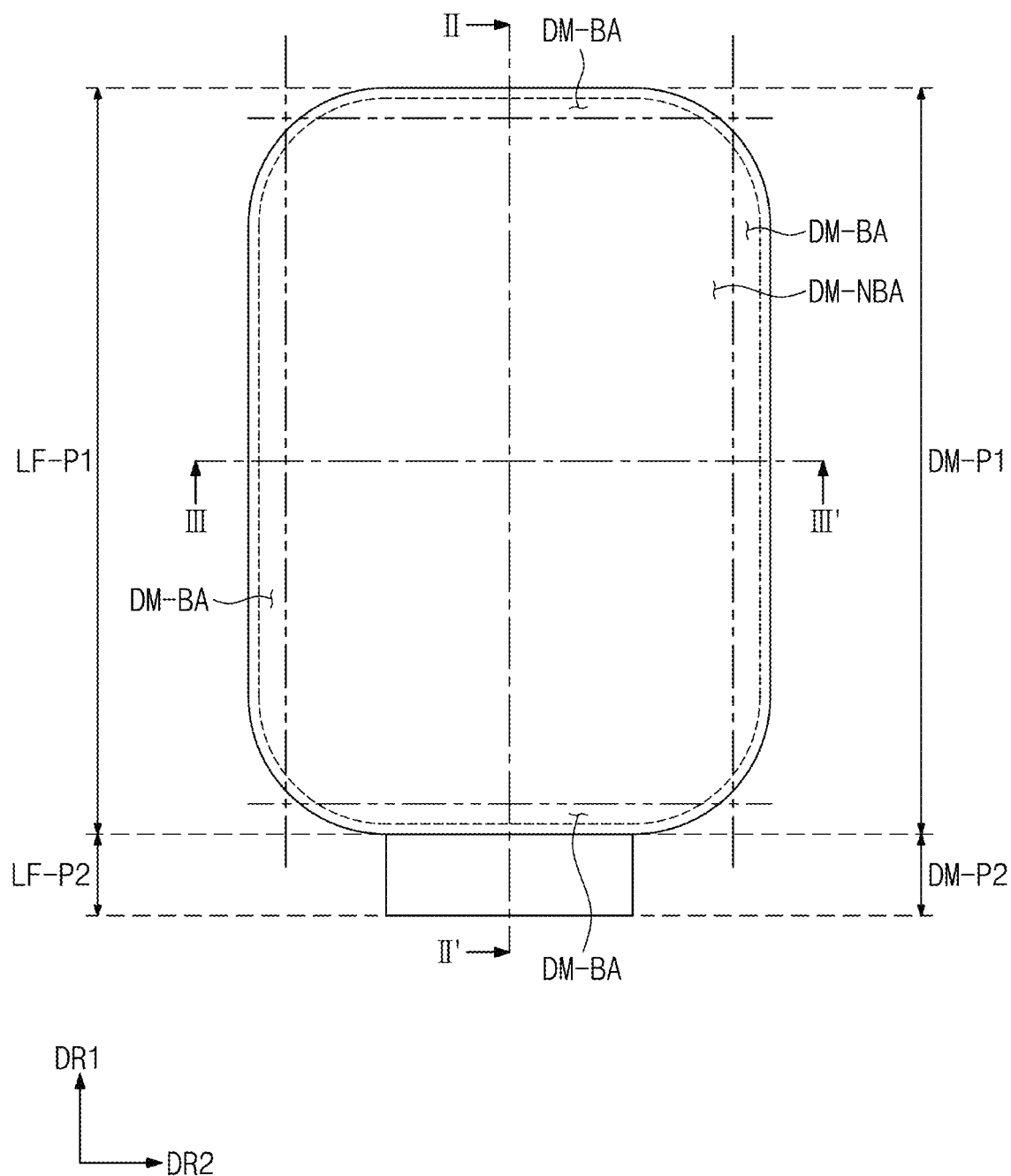
FIG. 9 is a plan view illustrating an exemplary embodiment of a display module according to the invention.
Figure 10A:
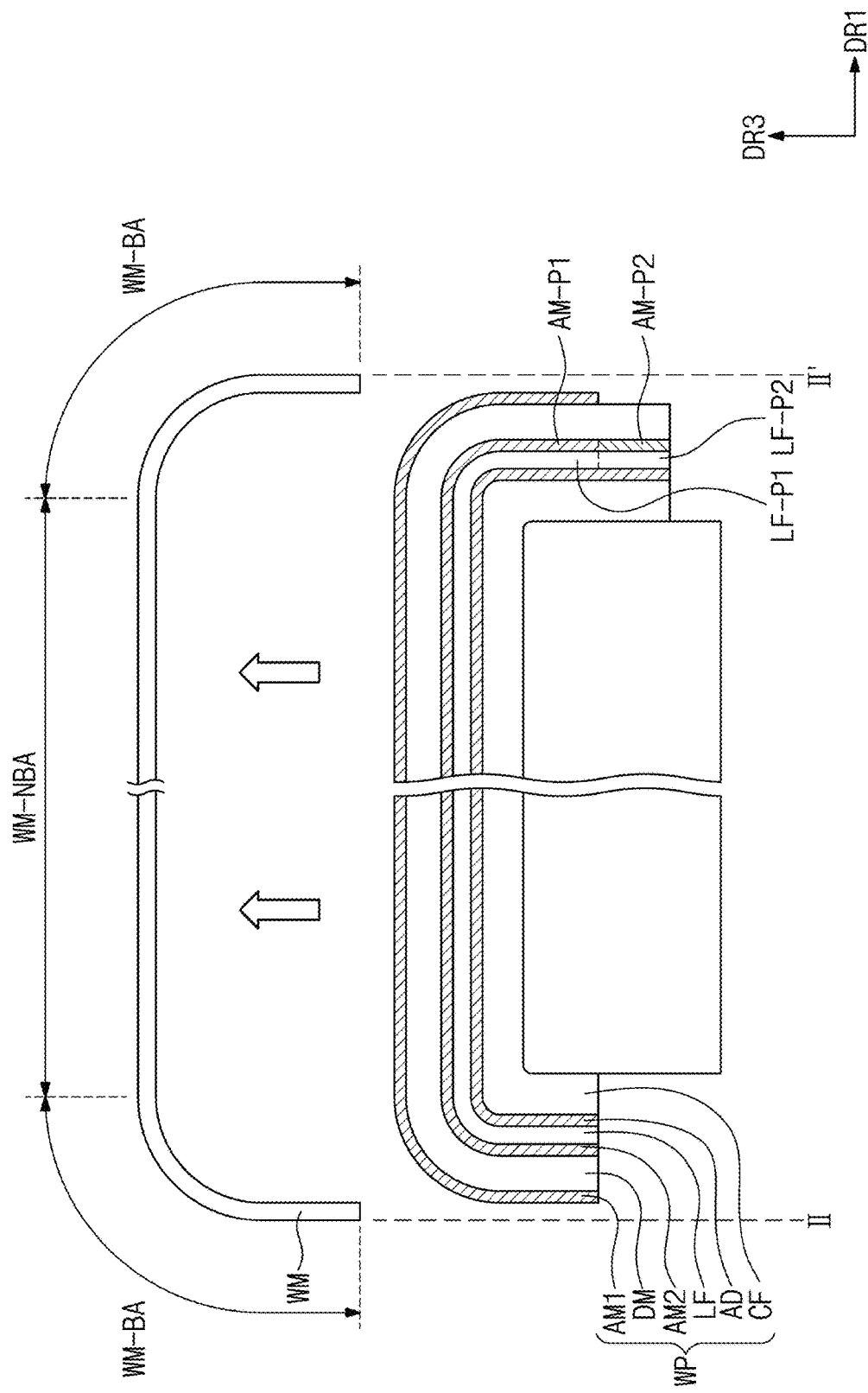
FIGS. 10A to 10C are cross-sectional views illustrating an exemplary embodiment of a process of manufacturing a display device according to the invention.
Figure 10B:
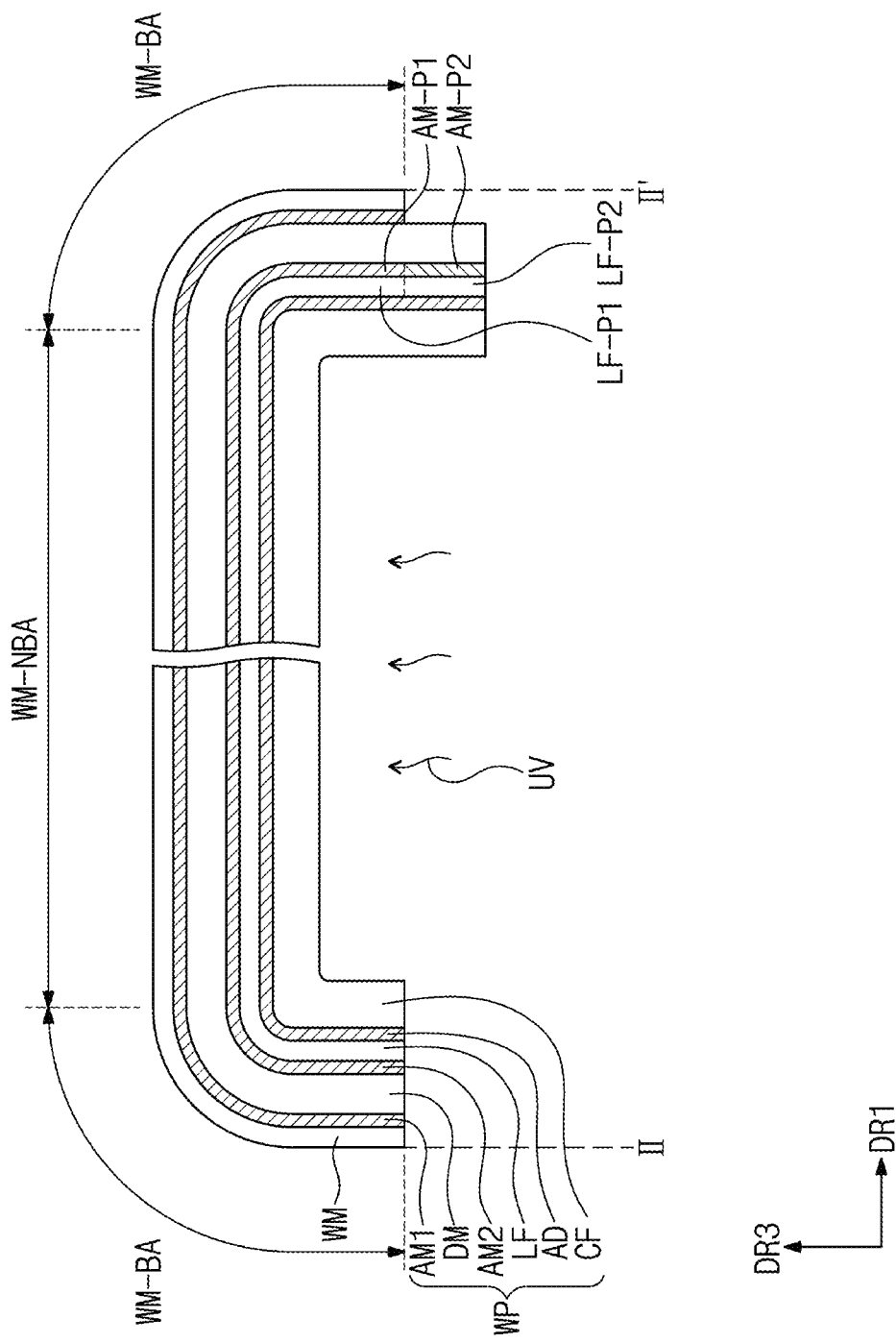
Figure 10C:
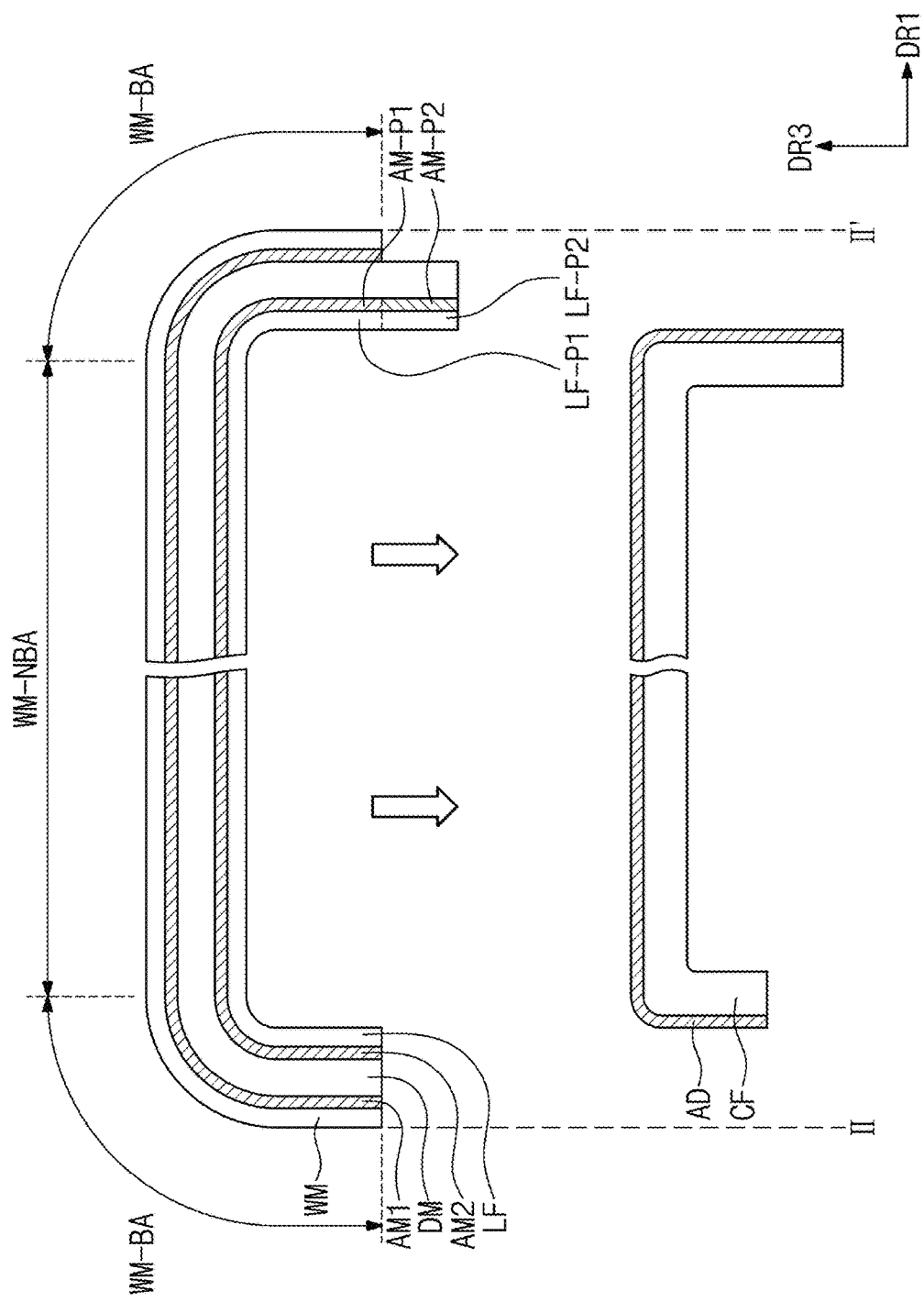

FIG. 9 is a plan view illustrating an exemplary embodiment of a display module DM according to the invention. FIGS. 10A to 10C are cross-sectional views illustrating an exemplary embodiment of a process of manufacturing a display device according to the invention.

As illustrated in FIG. 9, the display module DM includes a first portion DM-P1 coupled to the window WM and a second portion DM-P2 extending from the first portion DM-P1. The display module DM may include a non-bending area DM-NBA and four bending areas DM-BA corresponding to the non-bending area NBA and the four bending areas BA in FIG. 6, respectively.

A method for manufacturing a display device in the exemplary embodiment may be substantially the same as the method for manufacturing the display device described with reference to FIGS. 5A to 5F. Although FIGS. 10A to 10C are illustrated with respect to a cross-section taken along line II-II' of FIG. 9, FIGS. 10A to 10C correspond to FIGS. 5D to 5F, respectively. Since the window WM in FIG. 2 and the window WM in FIG. 7 are different in shape, cross-sections of the manufacturing process are also different from each other.

On the cross-section, the bending area DM-BA of the display module DM is coupled to the second area WM-BA of the window WM through the first adhesive member AM1. As the first area adhesive member AM-P1 having a relatively small elastic modulus is disposed in the bending area WM-BA, the stress applied to the bending area WM-BA of the window WM by the display module DM and the protection film LF may be reduced. As each of the first adhesive member AM1 and the second adhesive member AM2 extends in the bending area WM-BA, the bending stress may be reduced.

In an exemplary embodiment of the invention, a photo-curing process in FIG. 10B may be omitted.

As described above, the stress applied to the second area of the window by the bending of the display module and the protection film may be reduced. As the first area adhesive member having a relatively small elastic modulus is disposed between the display module and the protection film, the stress generated at the bending portion of the display module and the bending portion of the protection film, each of which has a small curvature radius, may be reduced. Thus, a crack defect of the window may be reduced.

As the second area adhesive member having a relatively great elastic modulus is disposed between the bonding portion of the display module and the protection film, the bonding portion of the display module may have a relatively great strength in comparison with the bending portion of the display module. As the strength of the bending portion of the display module is greater than the reference strength, the coupling force between the circuit board and the display module may increase, and the defects generated in the bonding process may be reduced.

Although the exemplary embodiments of the invention have been described, it is understood that the invention should not be limited to these exemplary embodiments but various changes and modifications may be made by one ordinary skilled in the art within the spirit and scope of the invention as hereinafter claimed.

Hence, the real protective scope of the invention shall be determined by the technical scope of the accompanying claims.

What is claimed is:

1. A display device comprising:
a window comprising a first area which provides a front surface and a second area which is bent from the first area and provides a side surface;
a display module comprising a first portion coupled to the window and a second portion extending from the first portion to an edge of the display module;
a first adhesive member which contacts the window and the first portion of the display module and is not disposed on the second portion of the display module;
a protection film comprising a first film portion corresponding to the first portion and a second film portion corresponding to the second portion, the protection film being disposed below the display module;
a first area adhesive member which couples the first portion and the first film portion;
a second area adhesive member which couples the second portion and the second film portion and having an elastic modulus greater than an elastic modulus of the first area adhesive member; and
a circuit board coupled to the second portion,
wherein an empty space is defined by an edge of the first adhesive member and defined directly on the second portion of the display module so that the second portion of the display module is not coupled to the window by an adhesive member.

2. The display device of claim 1, wherein the first area adhesive member has the elastic modulus of about 0.01 megapascal to about 10 megapascals, and
the second area adhesive member has the elastic modulus of about 1 megapascal to about 200 megapascals.

3. The display device of claim 1, wherein the first area adhesive member has a thickness greater than a thickness of the second area adhesive member.

4. The display device of claim 3, wherein the first area adhesive member has the thickness of about 1 micrometer to 100 micrometers, and
the second area adhesive member has the thickness of about 1 micrometer to 200 micrometers.

5. The display device of claim 3, wherein the first film portion has a thickness less than a thickness of the second film portion.

6. The display device of claim 3, wherein the first film portion has an area greater than an area of the second film portion.

7. The display device of claim 3, wherein the first film portion is spaced apart from the second film portion.

8. The display device of claim 1, wherein the second area further provides a curved surface, and
the second area comprises a curved area which provides the curved surface and a side area which provides the side surface.

9. The display device of claim 8, wherein the curved area has a curvature radius of about 2 millimeters to about 5 millimeters.

10. The display device of claim 8, wherein an angle between the first area and the side area is about 80 degrees to about 90 degrees.

11. The display device of claim 10, wherein the side surface has a width of about 4 millimeters to about 8 millimeters.

12. The display device of claim 1, wherein the front surface is defined by a first directional axis and a second directional axis,
- the second area comprises two bending areas facing each other in the first directional axis and overlapping the display module and the two bending areas facing each other in the second directional axis and overlapping the display module.

13. The display device of claim 12, wherein the second portion protrudes to the outside of one of the bending areas.

14. The display device of claim 1, wherein the display module further comprises:
- a display panel;
- an input sensor disposed on the display panel; and
- an anti-reflection unit disposed on the display panel.

15. The display device of claim 1, wherein the second portion is bent such that the second portion faces the first portion.

16. The display device of claim 1, wherein the first area adhesive member is coupled to an entirety of the first portion, and the second area adhesive member is coupled to an entirety of the second portion.

17. The display device of claim 1, wherein the second area adhesive member is coupled to a portion of the first portion.

* * * * *